(12) United States Patent
Uemura et al.

(10) Patent No.: US 12,163,813 B2
(45) Date of Patent: Dec. 10, 2024

(54) OPTICAL ENCODER AND CONTROL APPARATUS FOR RECEIVING LIGHT THAT FORMS MOIRE FRINGES FROM A GRATING PATTERN

(71) Applicant: CANON KABUSHIKI KAISHA, Tokyo (JP)

(72) Inventors: Takanori Uemura, Saitama (JP); Chihiro Nagura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 17/306,299

(22) Filed: May 3, 2021

(65) Prior Publication Data

US 2021/0348954 A1 Nov. 11, 2021

(30) Foreign Application Priority Data

May 8, 2020 (JP) .................................. 2020-082633
Sep. 30, 2020 (JP) .................................. 2020-164698

(51) Int. Cl.
*G01D 5/347* (2006.01)
*G01D 5/38* (2006.01)

(52) U.S. Cl.
CPC ....... *G01D 5/34715* (2013.01); *G01D 5/3473* (2013.01); *G01D 5/38* (2013.01)

(58) Field of Classification Search
CPC ..... G01D 5/34715; G01D 5/3473; G01D 5/38
See application file for complete search history.

(56) References Cited

U.S. PATENT DOCUMENTS

| 5,067,816 | A | * | 11/1991 | Ichikawa | ................. | G01D 5/38 |
| | | | | | | 250/237 G |
| 6,794,637 | B1 | * | 9/2004 | Holzapfel | ................. | G01D 5/38 |
| | | | | | | 341/13 |
| 9,618,370 | B2 | * | 4/2017 | Nagura | .................... | G01D 5/38 |
| 2015/0285662 | A1 | * | 10/2015 | Nagura | .................... | G01D 5/38 |
| | | | | | | 250/231.1 |
| 2020/0088552 | A1 | * | 3/2020 | Nagura | .................... | G01D 5/38 |

FOREIGN PATENT DOCUMENTS

| DE | 10 2016 218680 A1 | 3/2017 |
| JP | 2007248299 A | 9/2007 |
| JP | 2011075581 A | 4/2011 |
| JP | 4 843342 B2 | 12/2011 |
| JP | 2018105845 A | 7/2018 |
| JP | 2020046223 A | 3/2020 |

\* cited by examiner

*Primary Examiner* — Jennifer D Bennett
(74) *Attorney, Agent, or Firm* — Canon U.S.A., Inc. IP Division

(57) ABSTRACT

An optical encoder includes a first grating pattern having a first pitch, a second grating pattern having a second pitch, a third grating pattern having a third pitch different from the second pitch, and a light receiving element configured to receive light from the third grating pattern in an order from a side of a light source, wherein first moire fringes including a shadow of the third grating pattern are formed on an exit plane of the third grating pattern due to a difference between the second pitch and the third pitch, and wherein the light receiving element receives light that forms second moire fringes in which the shadow of the third grating pattern is smoothed more than in the first moire fringes by placing the third grating pattern and the light receiving element away from each other.

5 Claims, 17 Drawing Sheets

OPTICAL ENCODER AND CONTROL APPARATUS FOR RECEIVING LIGHT THAT FORMS MOIRE FRINGES FROM A GRATING PATTERN

BACKGROUND OF THE INVENTION

Field of the Invention

The present invention relates to an optical encoder and a control apparatus.

Description of the Related Art

As an optical encoder, Japanese Patent Application Laid-Open No. 2007-248299 discusses an encoder using a moire detection method of detecting moire fringes formed by disposing a grating pattern having a slightly different pitch from a pitch of a scale pattern between the scale pattern and a light receiving element. Since a pitch of the moire fringes becomes significantly larger than the pitch of the scale pattern, the encoder using the moire detection method can acquire a high-resolution incremental signal using a large light receiving element.

However, reflection of a shadow of the grating pattern with a high frequency on the moire fringes can cause a distortion or an individual difference of the incremental signal. Given this situation, in the encoder discussed in Japanese Patent Application Laid-Open No. 2007-248299, a resolving power is decreased by reducing a numerical aperture of a telecentric lens so that the shadow of the high-frequency grating pattern is not resolved.

However, there is an issue that inclusion of an optical component such as the telecentric lens in the encoder complicates a configuration, and increases the size of the encoder.

SUMMARY OF THE INVENTION

According to an aspect of the present invention, an optical encoder includes a light source, a first grating pattern having a first pitch, light from the light source being incident on the first grating pattern, a second grating pattern having a second pitch, light from the first grating pattern being incident on the second grating pattern, a third grating pattern having a third pitch different from the second pitch, light from the second grating pattern being incident on the third grating pattern, and a light receiving element configured to receive light from the third grating pattern, wherein first moire fringes including a shadow of the third grating pattern are formed on an exit plane of the third grating pattern due to a difference between the second pitch and the third pitch, and wherein the light receiving element receives light that forms second moire fringes in which the shadow of the third grating pattern is smoothed more than in the first moire fringes by placing the third grating pattern and the light receiving element away from each other.

According to another aspect of the present invention, an optical encoder includes a light source, a first grating pattern having a first pitch, light from the light source being incident on the first grating pattern, a second grating pattern having a second pitch, light from the first grating pattern being incident on the second grating pattern, a third grating pattern having a third pitch different from the second pitch, light from the second grating pattern being incident on the third grating pattern, and a light receiving element array configured to receive light from the third grating pattern, wherein the light receiving element array includes a plurality of light receiving elements configured to output signals in mutually different phases, wherein a shadow of the first grating pattern and a shadow of the third grating pattern are projected on a light receiving surface of the light receiving element array, and wherein, where D is a distance between centers of adjacent light receiving elements among the plurality of light receiving elements, P is a pitch of the shadow of the first grating pattern or a pitch of the shadow of the third grating pattern, and n is a natural number, D/P is in a range of n−¼ to n+¼ inclusive.

According to yet another aspect of the present invention, an optical encoder includes a light source, a first grating pattern having a first pitch, light from the light source being incident on the first grating pattern, a second grating pattern having a second pitch, light from the first grating pattern being incident on the second grating pattern, a third grating pattern having a third pitch different from the second pitch, light from the second grating pattern being incident on the third grating pattern, and a light receiving element array configured to receive light from the third grating pattern, wherein the light receiving element array includes a plurality of groups being periodically arrayed, each of the groups including a plurality of light receiving elements configured to output signals in mutually different phases, wherein the light receiving element array includes a first light receiving element group and a second light receiving element group, and is configured to combine a signal from the first light receiving element group and a signal from the second light receiving element group and output a resulting signal, and wherein at least one of a shadow of the first grating pattern and a shadow of the third grating pattern is projected on the first light receiving element group and the second light receiving element group in mutually different phases.

Further features of the present invention will become apparent from the following description of exemplary embodiments with reference to the attached drawings.

DESCRIPTION OF THE EMBODIMENTS

Exemplary embodiments of the present invention will be described in detail below with reference to the accompanying drawings. Each of the embodiments of the present invention described below can be implemented solely or as a combination of a plurality of the embodiments or features thereof where necessary or where the combination of elements or features from individual embodiments in a single embodiment is beneficial.

Figure 1:
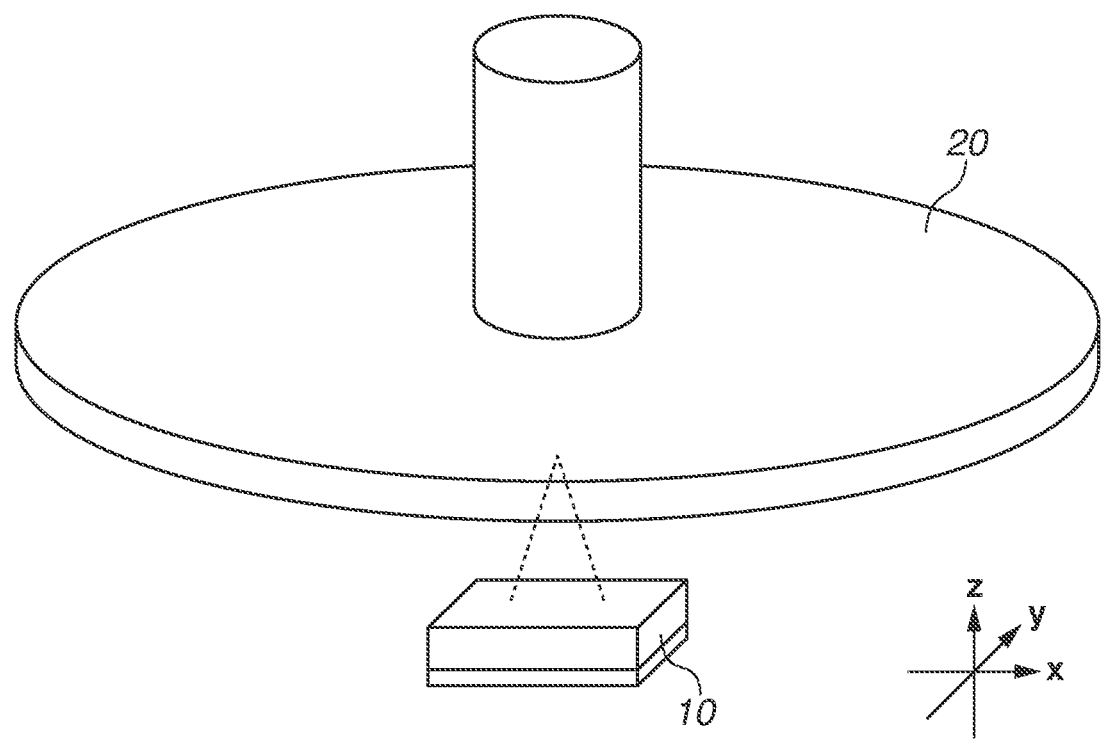
FIG. 1 is a schematic diagram illustrating an optical encoder.

FIG. 1 illustrates a configuration of an optical encoder (hereinafter simply referred to as an encoder). The encoder is a rotary encoder that includes a sensor unit 10 attached to a fixed portion of an apparatus (not illustrated), and a scale 20 that is attached to a movable portion of the apparatus and that is rotatable with respect to the sensor unit 10. Alternatively, the scale 20 may be attached to the fixed portion of the apparatus, and the sensor unit 10 may be attached to the movable portion of the apparatus. In other words, the sensor unit 10 and the scale 20 are to be movable relative to each other.

In FIG. 1, illustration of gratings formed on the sensor unit 10 and the scale 20 is omitted. Light from the sensor unit 10 is indicated by broken lines, and is emitted to a measurement region of the scale 20. A moving direction of the scale 20 in the measurement region of the scale 20 is an X-direction in FIG. 1. In the following description, the moving direction of the scale 20 with respect to the sensor unit 10 (the X-direction in FIG. 1), i.e., a relative moving direction between the scale 20 and the sensor unit 10, is hereinafter referred to as a position detection direction. The scale 20 is a reflection type scale in the present exemplary embodiment, but may be a transmission type scale.

Figure 2:
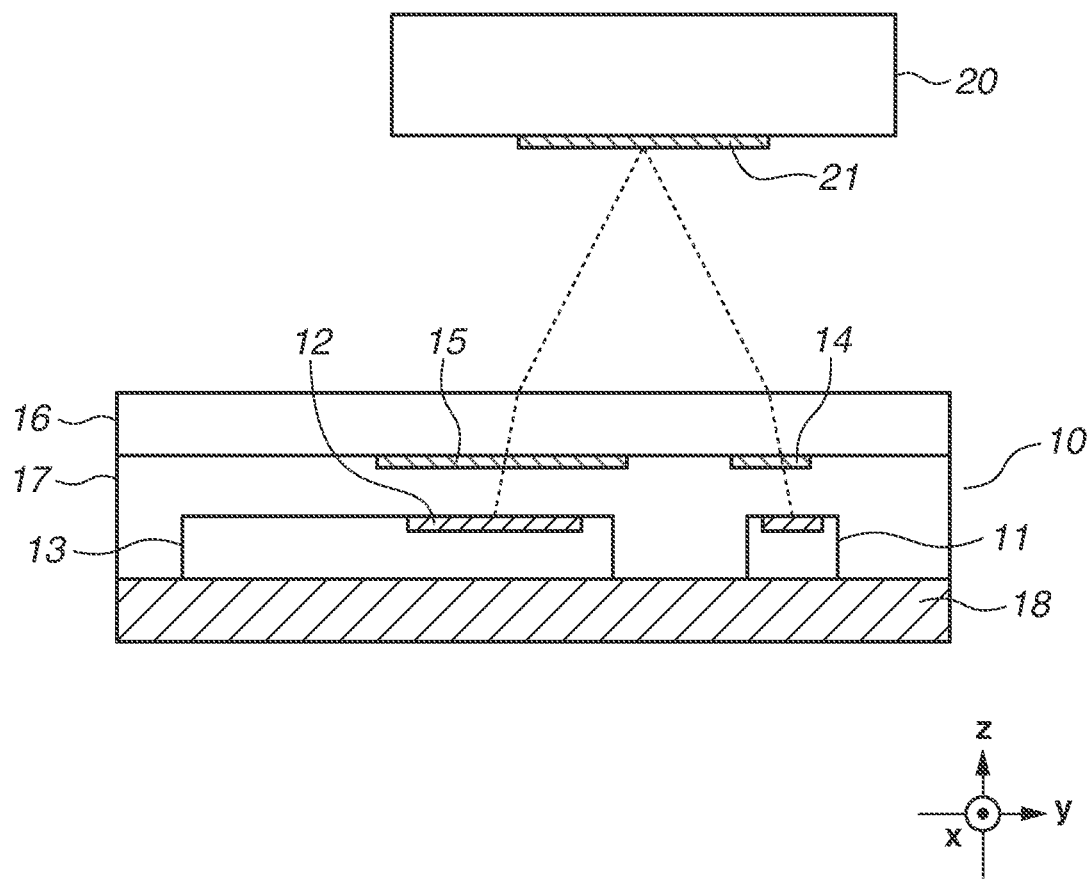
FIG. 2 is a schematic diagram illustrating a cross-section structure of the optical encoder.
Figure 3:
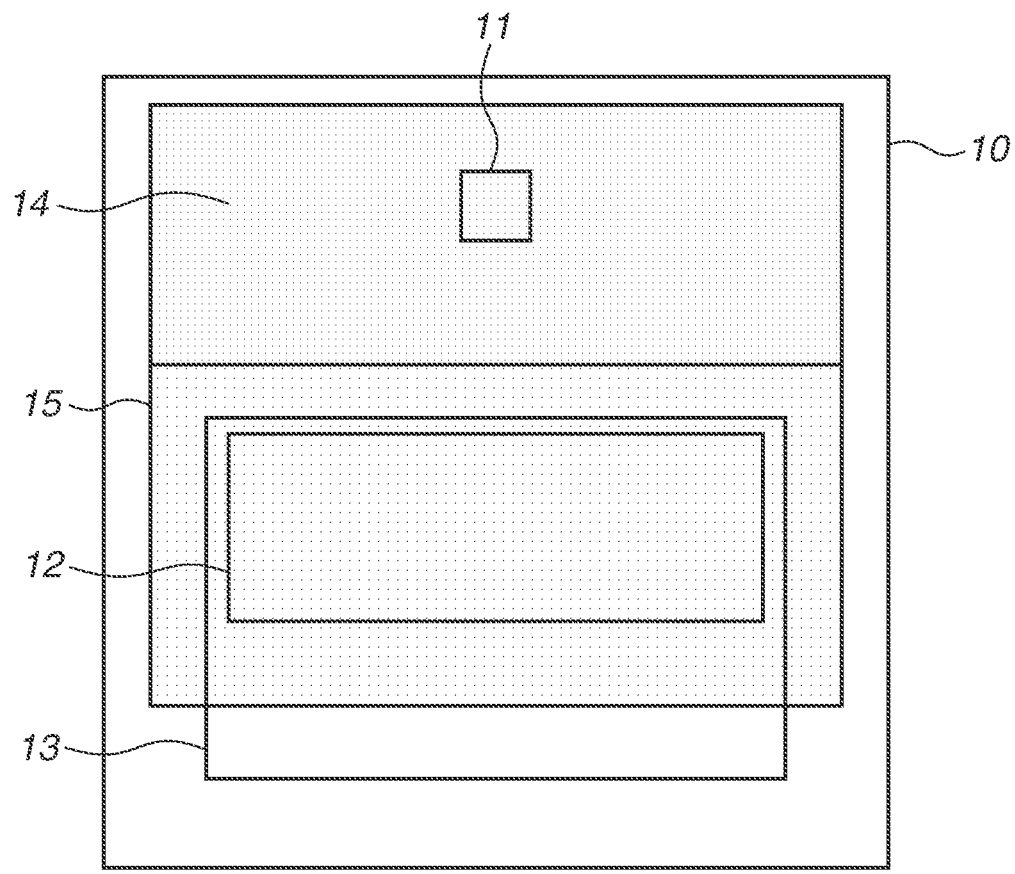
FIG. 3 is a plan view schematically illustrating a sensor unit of the optical encoder when viewed from a scale side.

FIG. 2 is a diagram illustrating a cross-section structure of the optical encoder when viewed from an X-axis side in FIG. 1. FIG. 3 is a plan view of the sensor unit 10. The sensor unit 10 is a light reception/emission integrated type sensor unit in which a light source 11 composed of a light emitting diode (LED) that emits divergence light and a light receiving integrated circuit (IC) 13 having a light receiving element array 12 are implemented in the same package.

On an optical path from the light source 11 to the scale 20, a light source grating pattern 14 is disposed as a first grating pattern that is formed as a transmission type diffraction grating having a pattern of a light transmission part and a light shielding part that are alternately arrayed in the position detection direction. Further, an index grating pattern 15 serving as a third grating pattern is disposed on an optical path from the scale 20 to the light receiving element array 12 between the scale 20 and the light receiving element array 12. The index grating pattern 15 is also formed as a transmission type diffraction grating having the pattern of a light transmission part and a light shielding part that are alternately arrayed in the position detection direction.

Each of the light source grating pattern 14 and the index grating pattern 15 is provided by forming a chromium film serving as the light shielding part on one surface of a cover glass plate 16. The cover glass plate 16 on which the light source grating pattern 14 and the index grating pattern 15 are provided is bonded to a substrate 18 on which the light source 11 and the light receiving IC 13 are mounted with a translucent resin 17. By this processing, the cover glass plate 16, the light source 11, and the light receiving IC 13 are optically integrated. While an ultraviolet (UV) curing resin or a thermosetting resin can be adopted as the translucent resin 17, the translucent resin 17 is not limited thereto and may be any type of resin having translucency. The sensor unit 10 does not include a large size optical component, such as a telecentric lens, and is compact and lightweight.

The light source grating pattern 14 has a first pitch P1, a scale pattern 21 has a second pitch P2, and the index grating pattern 15 has a third pitch P3 that is slightly different from the second pitch P2.

A divergence luminous flux emitted from the LED serving as the light source 11 passes through the light source grating pattern 14, thereby forming a light source array including a plurality of secondary point light sources that are mutually incoherent. The divergence luminous flux emitted from the light source grating pattern 14 is incident on the scale pattern 21. The secondary point light source is formed of a combination of the LED and the light source grating pattern 14, but a current confinement type LED, a semiconductor laser, or the like may be disposed instead as an effective point light source.

Figure 4:
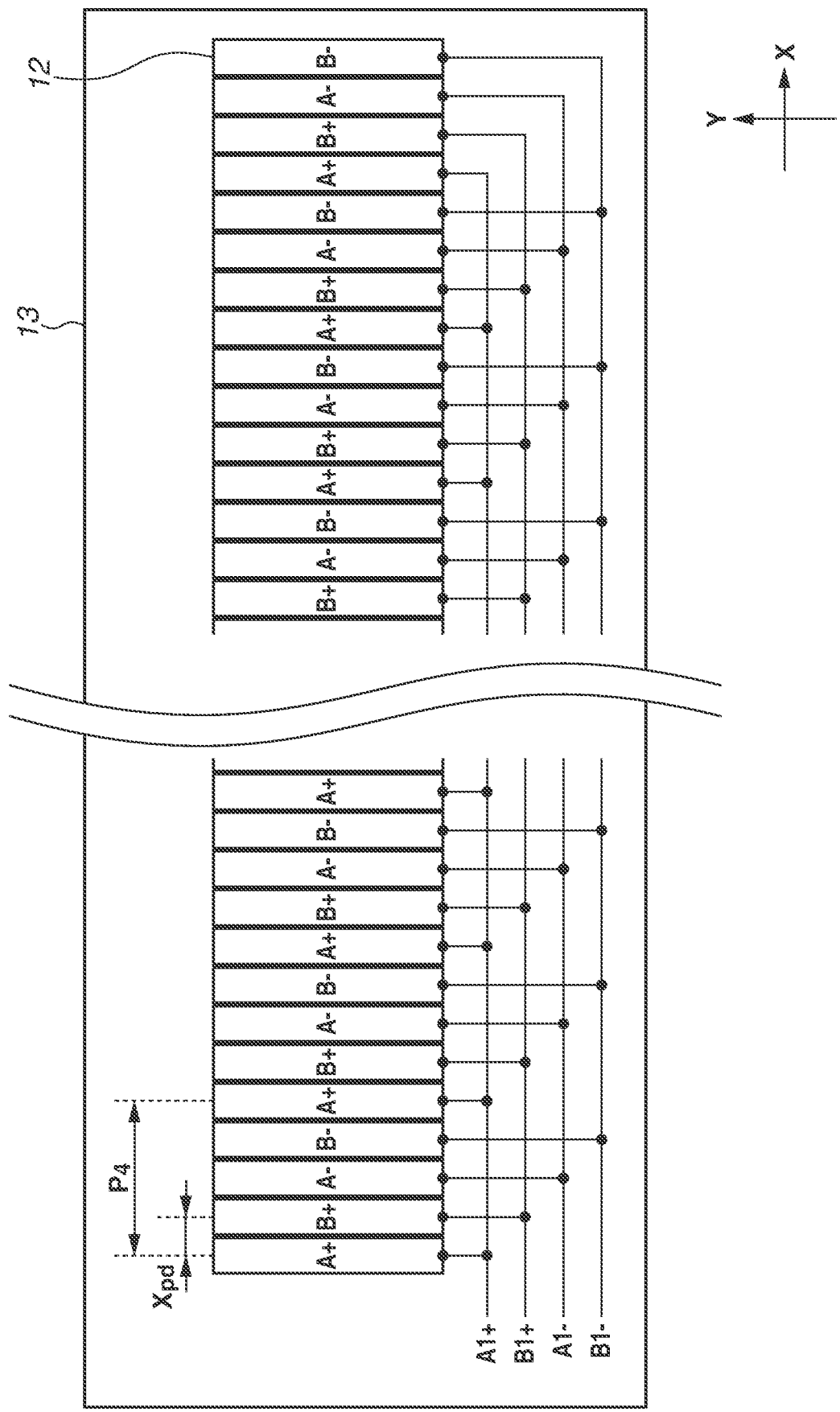
FIG. 4 is a diagram illustrating an array of light receiving elements.

The light receiving element array 12 includes a plurality of light receiving elements arrayed in the position detection direction (X-direction). The plurality of light receiving elements detects intensity distribution of light reflected by the scale pattern 21 serving as a second grating pattern arranged on the scale 20. FIG. 4 is a schematic diagram illustrating the light receiving element array 12. The light receiving element array 12 includes 32 light receiving elements arrayed in a line in the position detection direction. A distance Xpd between centers of two light receiving elements adjacent in the position detection direction (adjacent element pitch) is, for example, 64 µm. An A(+)-phase, a B(+)-phase, an A(−)-phase, and a B(−)-phase are cyclically allocated to the 32 light receiving elements in this order. The light receiving elements in these four phases constitute one aggregate (one group), and eight aggregates are arranged periodically. Eight light receiving elements in the same phase are electrically connected with one another, and outputs (currents) from the eight light receiving elements are added together and input to an I-V conversion amplifier (electric circuit) that is provided for each of the phases in a subsequent stage. A distance P4 (fourth pitch) between centers of two light receiving elements that are the nearest in the position detection direction among the light receiving elements in the same phase is 256 (=64×4) µm. In other words, a width of the aggregate of the light receiving elements is 256 µm.

Outputs from the light receiving elements in the A(+) and A(−)-phases are combined by a difference circuit (electric circuit) included in the light receiving IC 13 in the subsequent stage to generate an A-phase signal. Similarly, outputs from the light receiving elements in the B(+) and B(−)-phases are combined by a difference circuit (not illustrated) included in the light receiving IC 13 in the subsequent stage to generate a B-phase signal. Finally, the light receiving IC 13 outputs A- and B-phase waveform signals (incremental signals) of which phases are different from each other by approximately 90°.

Figure 5:
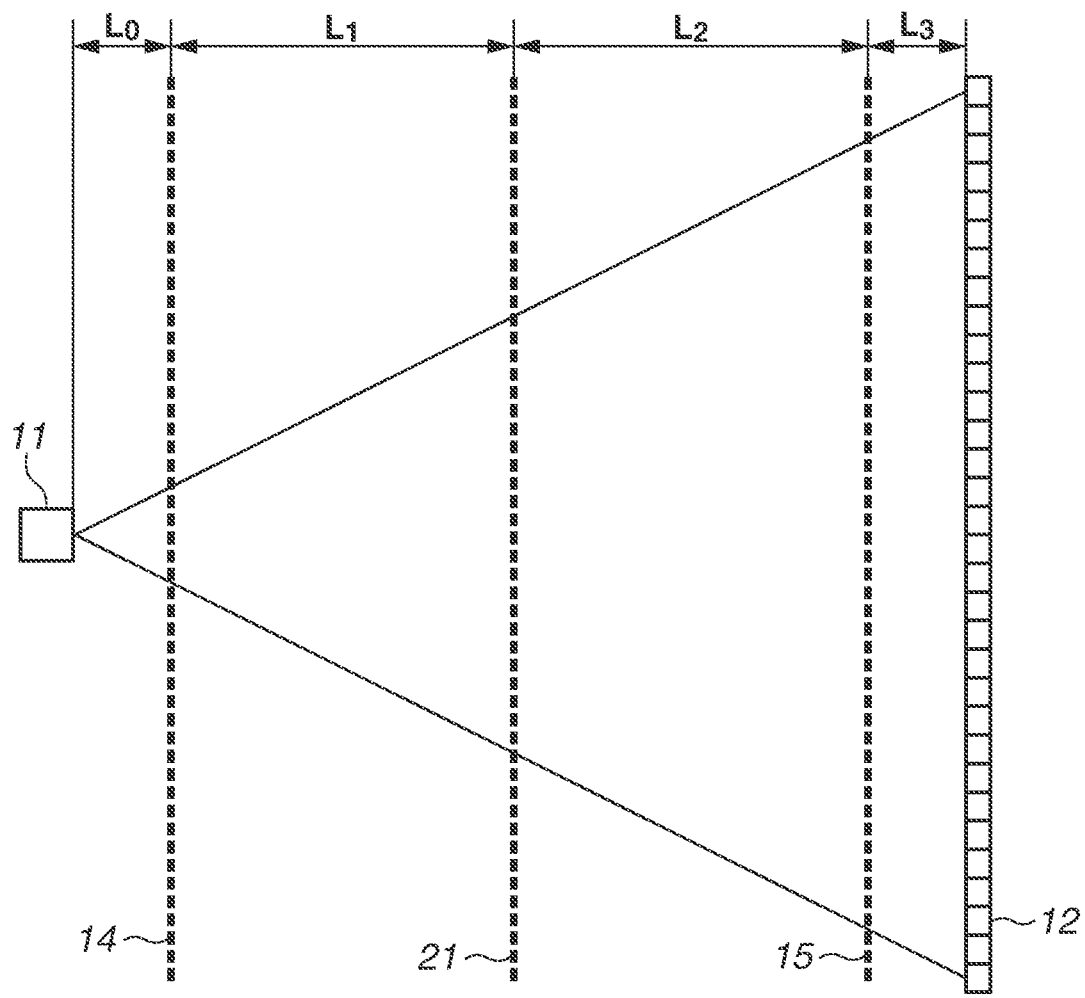
FIG. 5 is a development view illustrating an optical path of the optical encoder.

FIG. 5 is a development view illustrating the optical path of the encoder. FIG. 5 illustrates reflection of light by the scale pattern 21 in a developed state as though the light is transmitted. A distance L1 from the light source grating pattern 14 to the scale pattern 21 is set to be equal to a distance L2 between the scale pattern 21 and the index grating pattern 15 or to be within a range regarded as being equal to the distance L2. Each of distances L0, L1, L2, and L3 is an effective optical path length, and is a value obtained by dividing a physical distance by a refractive index. Since the cover glass plate 16 and the translucent resin 17 each have a refractive index that is larger than one, the effective optical path length is smaller than the physical distance (interval).

Figure 6:
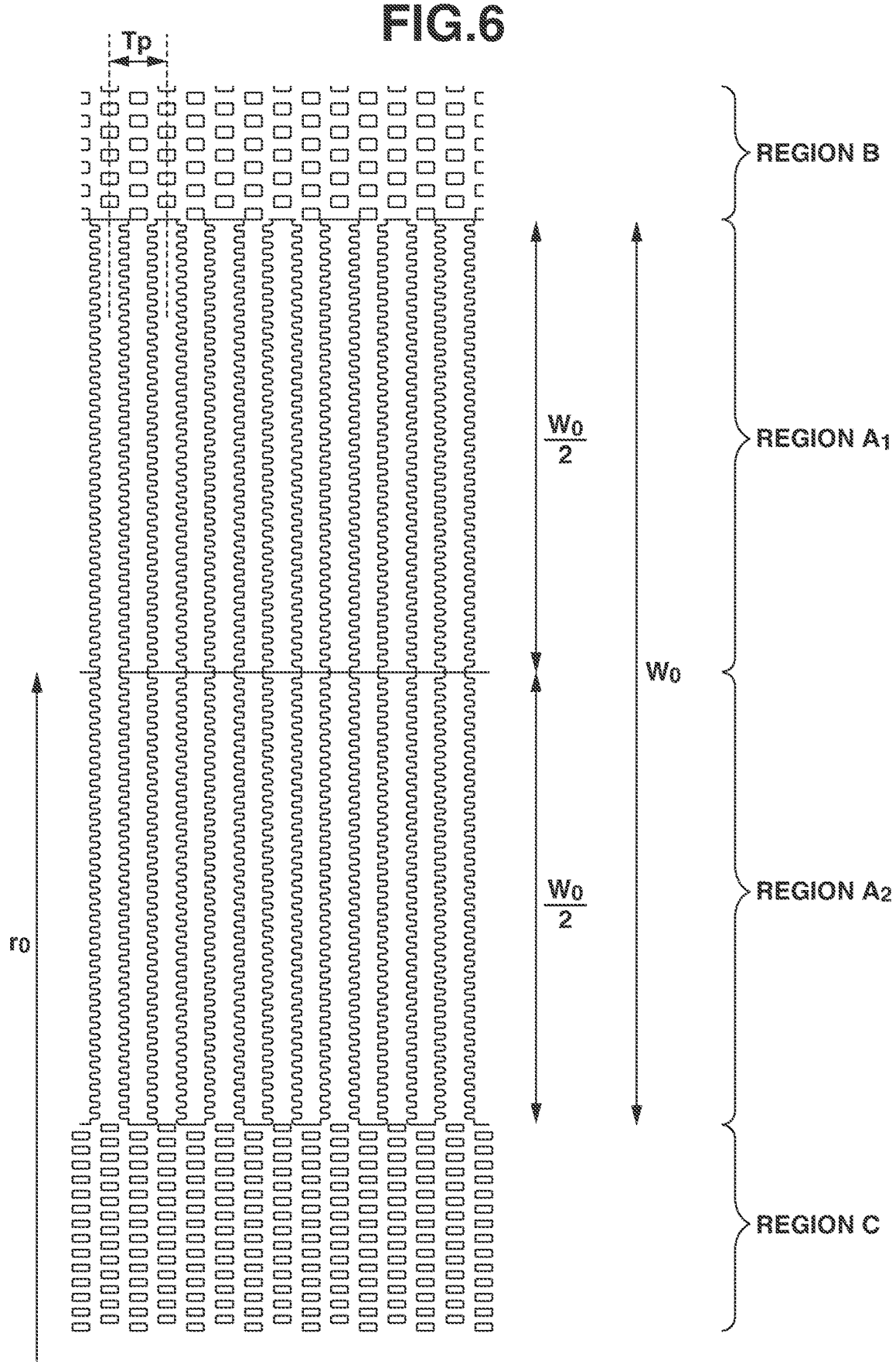
FIG. 6 is a diagram illustrating a scale pattern.

FIG. 6 illustrates part of the scale pattern 21 formed on the scale 20. The scale pattern 21 is a phase grating pattern. In FIG. 6, a gray region represents a recessed portion and a white region represents a raised portion. The scale pattern 21 is designed so that a phase difference caused by a level difference is approximately a half wavelength. A material of the scale 20 is glass, and a reflective film is formed on a surface of the scale 20. A region A1 is a region having a width W0/2 in an outer circumference direction from a radius r0 of a center of reading. A pitch of the scale 20 represented by a width W0 in a radial direction changes depending on the radius. Where N is the number of sets of the raised portion and the recessed portion of the grating of the scale 20, the radius r0 of the center of reading and the designed pitch P2 of the scale 20 can be brought into correspondence by the following formula.

$$2\pi r_0 = NP_2 \quad (1)$$

Meanwhile, a pitch Tp of the scale 20 represented by an angle and the pitch P2 of the scale 20 represented by a distance have the following relationship.

[Formula (2)]

$$\frac{P_2}{2\pi r_0} = \frac{T_p}{360°} \quad (2)$$

In a pattern of the region A1, a part in which the recessed portion has a width of Tp/3 and a part in which the recessed portion has a width of 2Tp/3 are arranged repeatedly in a radial direction. The widths of the recessed portions of the parts adjacent in the position detection direction are alternating. Meanwhile, a region A2 has a pattern in which the recessed portions each having a width of Tp/2 are repeatedly arranged in the radial direction by being shifted by Tp/6 between adjacent parts in the position detection direction. Directions of the shift are opposite between the parts adjacent in the position detection direction.

Each of the patterns of the regions A1 and A2 is designed to have a grating pitch in the radial direction so that ±first order diffracted light in the radial direction is hardly incident on the light receiving element array 12. This prevents a harmonic noise component from being mixed in signals. Setting the patterns illustrated in FIG. 6 to the regions A1 and A2 can prevent generation of third order diffracted light that decreases an allowable value for alignment. In addition, even if a manufacturing error occurs in the patterns, this configuration can prevent generation of zero order diffracted light that causes distortion of an incremental signal.

A region B, which is in an outer circumference direction from the region with the radius r0+W0/2, has a staggered pattern. An arrangement is made so that positions of recessed parts are shifted by a half pitch in the radial direction between the parts adjacent in the position detection direction. In addition, each of the widths of the recessed parts is designed to be Tp/3. Similarly, a region C, which is a region with the radius r0−W0/2, has a staggered pattern. In the region C, an arrangement is made so that the positions of the recessed parts are shifted by a half pitch in the radial direction between the parts adjacent in the position detection direction. In addition, each of the widths of the recessed parts is designed to be Tp/3.

Each of the patterns of the regions B and C is designed to have a grating pitch in the radial direction so that ±first order diffracted light in the radial direction is incident on the light receiving element array 12. Setting such a staggered pattern to each of the regions B and C allows a larger amount of light to be collected on the light receiving element array 12, and thus can increase light utilization efficiency.

Figure 7:
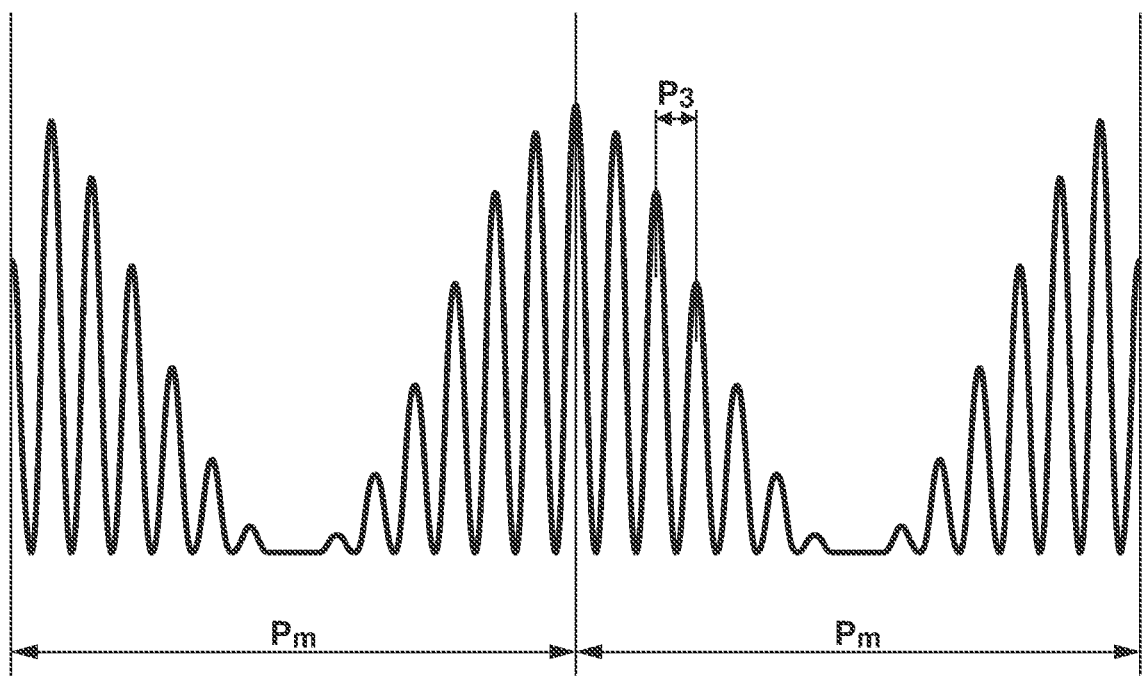
FIG. 7 is a diagram illustrating moire fringes formed on an exit plane of an index grating pattern.

Interference fringes having the pitch P2 are formed by positive first order diffracted light and negative first order diffracted light in the position detection direction of the scale pattern 21 interfering with each other on an incident plane of the index grating pattern 15. Since the pitch P3 of the index grating pattern 15 is different from the pitch P2 of the interference fringes, moire fringes (first moire fringes) are formed on an exit plane of the index grating pattern 15. FIG. 7 illustrates the moire fringes (light intensity distribution) on the exit plane of the index grating pattern 15. The light intensity distribution corresponds to a distribution obtained by superimposing a shadow of the index grating pattern 15 on the moire fringes having a coarse space pitch Pm. The space pitch Pm of the moire fringes can be represented by the following formula. In the formula below, ABS(x) is a function representing an absolute value of x.

[Formula (3)]

$$P_m = \text{ABS}\left(\frac{P_2 P_3}{P_2 - P_3}\right) \quad (3)$$

Light that has transmitted through the index grating pattern 15 propagates through a space from the index grating pattern 15 to the light receiving element array 12, forms moire fringes (second moire fringes) on a light receiving plane of the light receiving element array 12, and is received by the light receiving element array 12. The light intensity distribution of the second moire fringes is a distribution obtained by superimposing the shadow of the index grating pattern 15 on the moire fringes having a coarse space pitch Pm'. Since the light source 11 is a divergent light source, the pitch Pm' of the moire fringes is extended M3 times the pitch Pm of the moire fringes. An image magnification ratio M3 mentioned herein is represented by the following formula.

[Formula (4)]

$$M_3 = \frac{L_0 + L_1 + L_2 + L_3}{L_0 + L_1 + L_2} \quad (4)$$

Thus, the pitch Pm' of the moire fringes and a pitch P3' of the shadow of the index grating pattern 15 that are formed on the light receiving plane of the light receiving element array 12 are represented by the following formulas.

[Formula (5)]

$$P_m' = M_3 P_m = \frac{L_0 + L_1 + L_2 + L_3}{L_0 + L_1 + L_2} P_m \quad (5)$$

[Formula (6)]

$$P_3' = M_3 P_3 = \frac{L_0 + L_1 + L_2 + L_3}{L_0 + L_1 + L_2} P_3 \quad (6)$$

When the pitch Pm' of the moire fringes on the light receiving element array 12 matches the width (pitch) P4 of the aggregate of the light receiving elements, amplitude of signals output from the light receiving element array 12 becomes approximately maximum.

Meanwhile, the shadow of the index grating pattern 15 having the pitch P3' projected on the light receiving element array 12 becomes high frequency components, which distort a waveform of output signals and decrease the amplitude.

Misalignment of the cover glass plate 16 due to a manufacturing error changes the positions of the light source grating pattern 14 and the index grating pattern 15 with respect to the light receiving element array 12. As a result, the shadow of the index grating pattern 15 projected on the light receiving element array 12 also changes. On which phase of the A(+)-, B(+)-, A(−)-, and B(−)-phases a larger amount of shadow is projected affects an output from each of the light receiving elements. For this reason, a variation in the position of the cover glass plate 16 in a plurality of encoders to be manufactured can possibly cause a large individual difference in signal waveform.

In a first exemplary embodiment, the shadow of the index grating pattern 15 projected on the light receiving element array 12 is smoothed by utilizing an action of optical diffraction of the index grating pattern 15.

A diffraction angle θ of the first order diffracted light by the index grating pattern 15 is represented by the following formula using the pitch P3 of the index grating pattern 15, where a wavelength of the light source 11 is λ.

[Formula (7)]

$$\theta = \text{inverse } \sin\left(\frac{\lambda}{P_3}\right) \quad (7)$$

Light is diffracted by the index grating pattern 15 and thus propagates through the space from the index grating pattern 15 to the light receiving element array 12, thereby causing a luminous flux divergence. A luminous flux divergence d3 of positive first order diffracted light and negative first order diffracted light of the index grating pattern 15 is represented by the following formula using the distance L3 from the index grating pattern 15 to the light receiving element array 12. The luminous flux divergence d3 is proportional to the distance L3.

$$d_3 = 2L_3 \tan \theta \quad (8)$$

Figure 8:
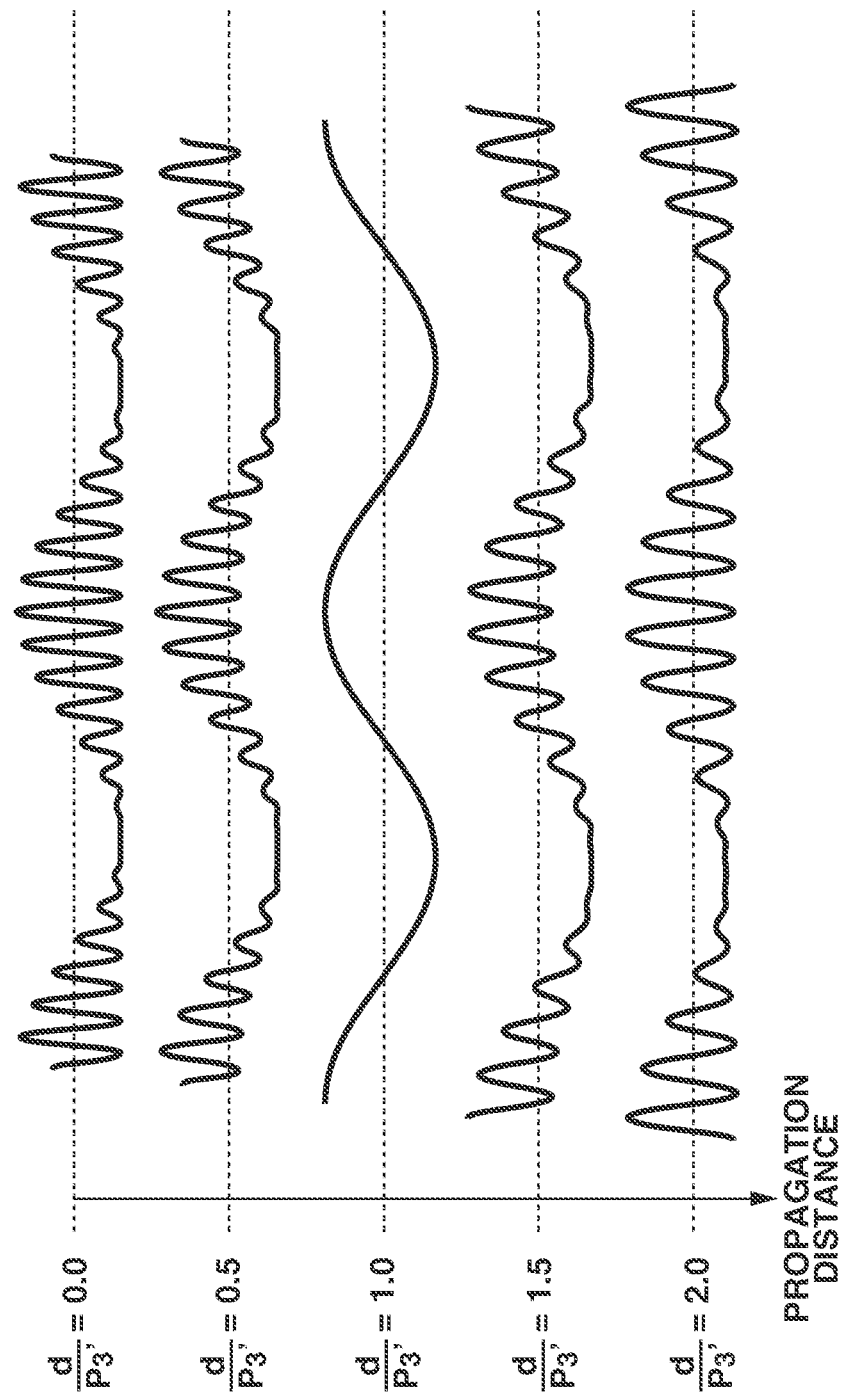
FIG. 8 is a diagram illustrating how the moire fringes are changed by diffraction action.

FIG. 8 is a diagram schematically illustrating how the second moire fringes on the light receiving element array 12 change when a ratio of the luminous flux divergence d3 to the pitch P3' of the shadow of the index grating pattern 15 projected on the light receiving element array 12 changes. When the exit plane of the index grating pattern 15 matches the light receiving plane of the light receiving element array 12 (d3/P3'=0.0), the second moire fringes on the light receiving element array 12 include high frequency components with a high contrast generated by the shadow of the index grating pattern 15.

A case is cited where the distance L3 from the index grating pattern 15 to the light receiving plane of the light receiving element array 12 is increased, and d3/P3' becomes 0.5. In this case, the high frequency components included in the second moire fringes (the shadow of the index grating pattern 15) on the light receiving element array 12 are somewhat smoothed, thereby the contrast of the high frequency components is decreased. As a result, the distortion or the individual difference of the signal waveform is decreased.

When the distance L3 is further increased and d3/P3' becomes 1.0, the center of the shadow of the index grating pattern 15 is irradiated with plus or minus first order light, thereby the light intensity distribution of the shadow is smoothed to the maximum. This significantly decreases the contrast of the high frequency components included in the second moire fringes on the light receiving element array 12, thereby preventing occurrence of the distortion or the individual difference of the signal waveform.

When the distance L3 is further increased and d3/P3' becomes 1.5, the contrast of the high frequency components included in the second moire fringes becomes somewhat high in comparison with the case of d3/P3'=1.0, but the high frequency components are somewhat smoothed in comparison with the case of d3/P3'=0.0.

When the distance L3 is further increased and d3/P3' becomes 2.0, the center of the transmission part (bright part) of the index grating pattern 15 is irradiated with plus or minus first order light, thereby rays of light reinforce each other in the bright part. In contrast, a shadow part is not irradiated with the plus or minus first order light, and a dark part remains dark. For this reason, the shadow of the index grating pattern 15 is projected on the light receiving element array 12 with a high contrast.

Figure 9:
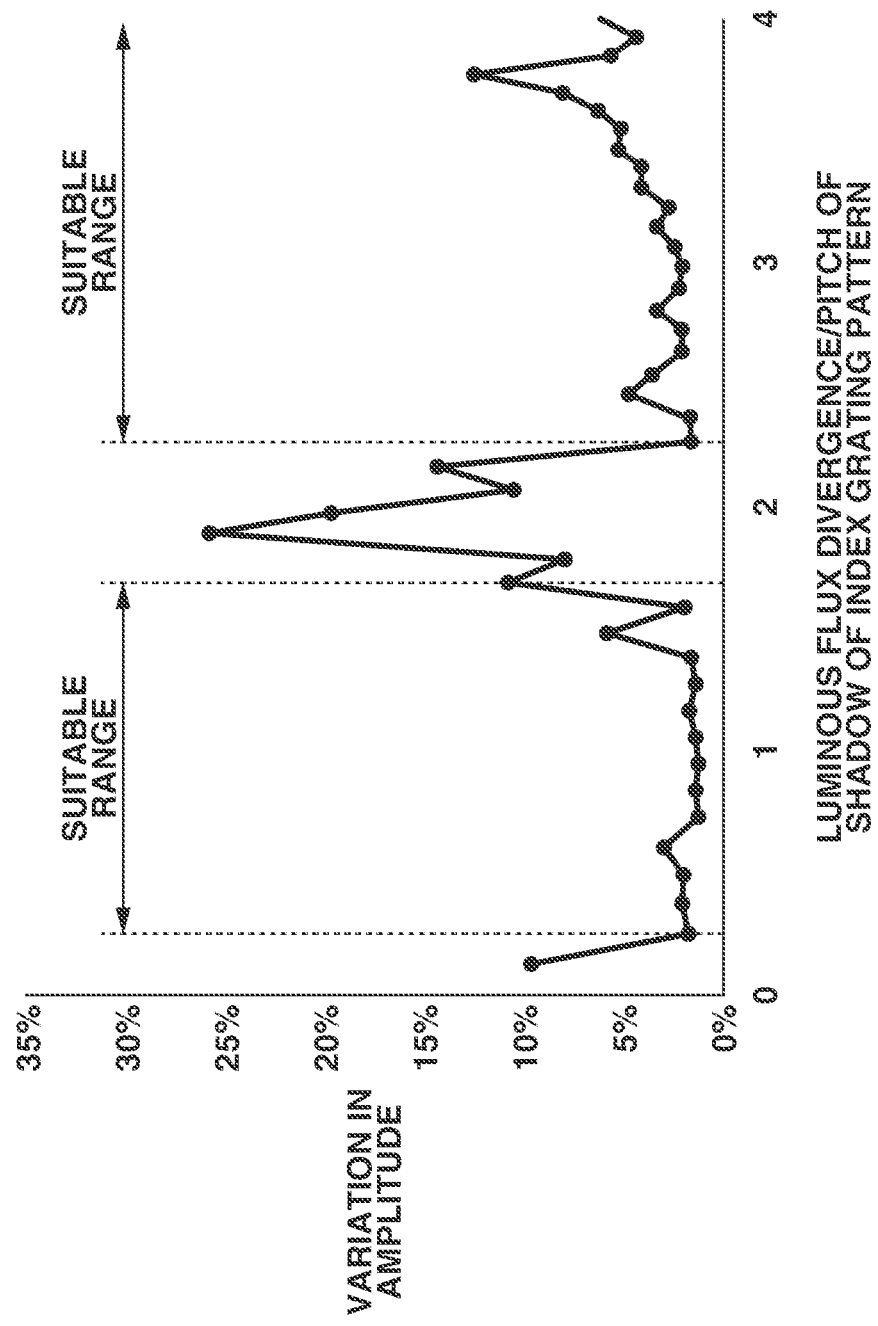
FIG. 9 is a diagram illustrating a variation in amplitude influenced by a shadow of the index grating pattern.

A description will be given of a case where the ratio of the luminous flux divergence d3 to the pitch P3' of the shadow of the index grating pattern 15 projected on the light receiving element array 12 changes. FIG. 9 illustrates an example of a result of calculating how much variation (individual difference) in amplitude of an output from the light receiving element array 12 occurs due to the misalignment of the cover glass plate 16. In FIG. 9, an abscissa axis represents the luminous flux divergence d3/the pitch P3' of the shadow of the index grating pattern 15, and an ordinate axis represents the variation in amplitude of the output from the light receiving element array 12.

In a case where the first moire fringes formed on the exit plane of the index grating pattern are detected by the light receiving element array 12 (d3/P3'=0.0), it is illustrated that a variation in amplitude is as large as approximately 15%. In contrast, it is illustrated that setting the ratio of the luminous flux divergence d3 to the pitch P3' of the shadow of the third grating pattern projected on the light receiving plane of the light receiving element array 12 to a value from 0.15 to 1.85 inclusive or higher than or equal to 2.15 can decrease the variation in amplitude to approximately lower than or equal to 10%.

More desirably, it is illustrated that setting the ratio of the luminous flux divergence d3 to the pitch P3' of the shadow of the third grating pattern projected on the light receiving plane of the light receiving element array 12 to a value from 0.25 to 1.75 inclusive or higher than or equal to 2.25 can decrease the variation in amplitude to approximately lower than or equal to 5%. In this manner, the variation in amplitude can be decreased by the light receiving element array 12 detecting the second moire fringes in which the shadow of the index grating pattern 15 projected on the light receiving element array 12 is smoothed in comparison with the first moire fringes.

Meanwhile, if the luminous flux divergence d3 becomes too large, the moire fringes (contrast) used for position detection by the encoder of the second moire fringes is also smoothed. For example, if the luminous flux divergence d3 matches the pitch Pm' of the moire fringes, the second moire fringes are smoothed, and the contrast is decreased to approximately zero. For this reason, the ratio of the luminous flux divergence d3, which is caused by the first order diffracted light from the third grating pattern propagating through the space from the third grating pattern to the light receiving element array 12, to the pitch Pm' of the moire fringes is a value lower than or equal to ½, desirably lower than or equal to ¼.

Subsequently, a description will be given of an influence of a shadow of the light source grating pattern 14 projected on the light receiving element array 12. Light that has transmitted through the light source grating pattern 14 propagates through the space from the light source grating pattern 14 to the light receiving element array 12, and the shadow of the light source grating pattern 14 is projected on the light receiving element array 12. Since the light source 11 is a divergent light source, a pitch P1' of the shadow of the light source grating pattern 14 projected on the light receiving element array 12 is extended M1 times the pitch P1 of the light source grating pattern 14. An image magnification ratio M1 mentioned herein is represented by the following formula.

[Formula (9)]

$$M_1 = \frac{L_0 + L_1 + L_2 + L_3}{L_0} \quad (9)$$

Thus, the pitch P1' of the shadow of the light source grating pattern 14 projected on the light receiving element array 12 is represented by the following formula.

[Formula (10)]

$$P_1' = M_1 P_1 = \frac{L_0 + L_1 + L_2 + L_3}{L_0} P_1 \quad (10)$$

When the pitch P1 of the shadow of the light source grating pattern 14 projected on the light receiving element array 12 becomes 0.5 times the width P4 of the aggregate of the light receiving elements (P1'/P4=0.5), a difference in amplitude between the A- and B-phases can be large. At this time, for example, when parts corresponding to the A(+) and A(−)-phases become shaded parts, the amplitude of the A-phase is decreased in comparison with the B-phase. Conversely, when parts corresponding to the B(+) and B(−)-phases become shaded parts, the amplitude of the B-phase is decreased in comparison with the A-phase. Misalignment of the light source grating pattern 14 with respect to the light receiving element array 12 due to a manufacturing error can cause a large individual difference in amplitude between the A- and B-phases.

Figure 10:
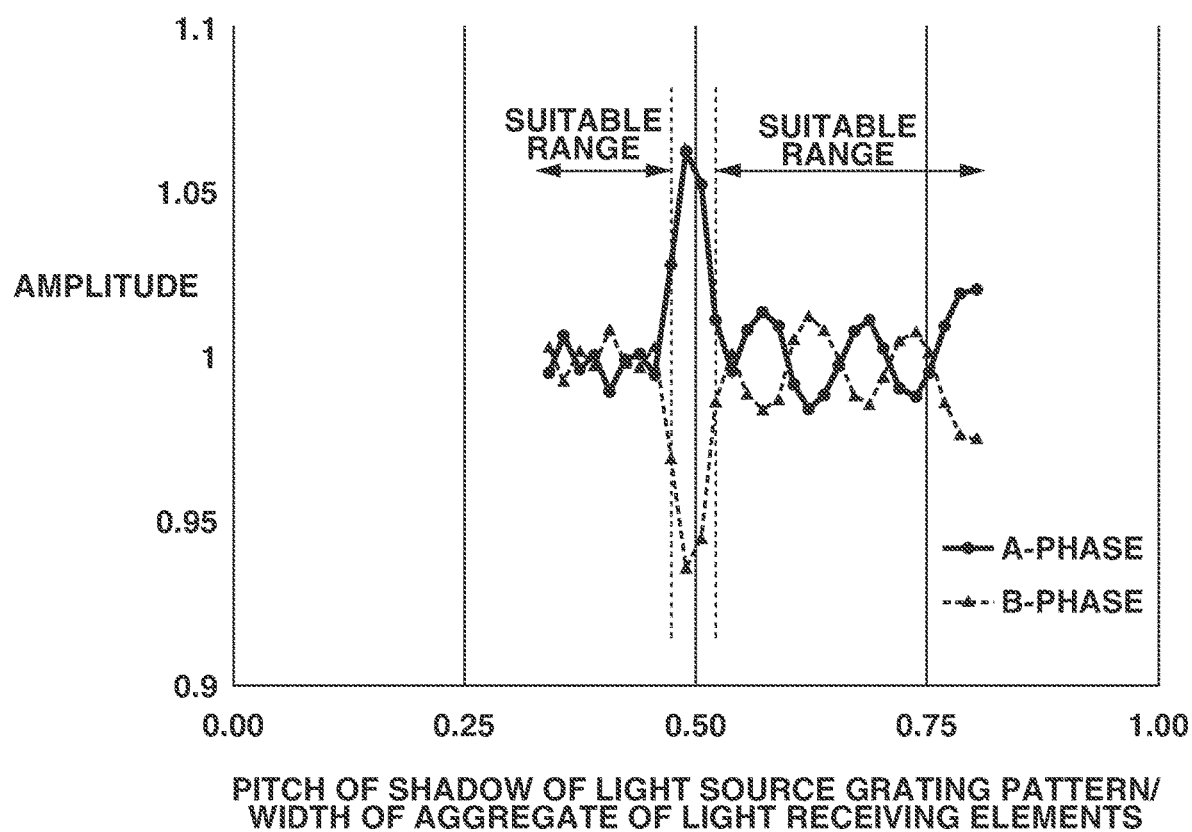
FIG. 10 is a diagram illustrating an amplitude of each phase influenced by a shadow of a light source grating pattern.

FIG. 10 illustrates an example of a result of calculating how the amplitude of each of the A- and B-phases changes when the ratio of the pitch P1' of the shadow of the light source grating pattern 14 projected on the light receiving element array 12 to the width P4 of the aggregate of the light receiving elements changes. In FIG. 10, an abscissa axis represents the pitch P1' of the shadow of the light source grating pattern 14/the width P4 of the aggregate of the light receiving elements, and an ordinate axis represents the amplitude of each of the A- and B-phases of the light receiving element array 12.

When the pitch P1' of the shadow of the light source grating pattern 14 projected on the light receiving element array 12 becomes 0.5 times the width P4 of the aggregate of the light receiving elements (P1'/P4=0.5), a difference in amplitude between the A- and B-phases is as large as ±7%. In contrast, it is illustrated that setting the ratio of the pitch of the shadow of the light source grating pattern 14 projected on the light receiving element array 12 to the width P4 of the aggregate of the light receiving elements to a value lower than or equal to 0.475 or higher than or equal to 0.525 can decrease the difference in amplitude between the A- and B-phases to approximately lower than or equal to 1.5%.

In the present exemplary embodiment, the light receiving element array 12 outputs signals in four phases that are mutually different by approximately 90°. However, the light receiving element array 12 is not limited to such a configuration and may output signals in three phases (A-, B-, and C-phases) that are mutually different by approximately 120°. In this case, when the pitch of the shadow of the light source grating pattern 14 projected on the light receiving element array 12 equals to the width of the aggregate of the light receiving elements (the fourth pitch) multiplied by one (P1'/P4=1), a difference in amplitude between the A-, B-, and C-phases can be large. This is because the shadow of the light source grating pattern 14 can be selectively projected on the light receiving elements in a specific phase. The pitch of the shadow of the light source grating pattern 14 projected on the light receiving element array 12 is shifted from the fourth pitch so that the ratio is preferably set to a value lower than or equal to 0.95 or higher than or equal to 1.05. This configuration allows the shadow of the light source grating pattern 14 to be scattered and projected on the light receiving elements in the three phases, and thus can decrease the difference in amplitude between the A-, B-, and C-phases.

First Example

In the first example, a pitch of the light source grating pattern 14 is 20 μm, a pitch of the scale pattern 21 is 20 μm, a pitch of the index grating pattern 15 is 21.92 μm. In addition, a space distance from the cover glass plate 16 to the scale 20 is 10 mm, a thickness of the cover glass plate 16 is 0.7 mm, and a distance from the light source 11 and the light receiving element array 12 to the cover glass plate 16 is 0.6 mm. An optical encoder according to the first example can obtain an incremental signal having a pitch of 10 μm.

A refractive index of each of the cover glass plate 16 and the translucent resin 17 is 1.5, and effective optical path lengths of L0, L1, L2, and L3 are 0.40 mm, 147 mm, 1.47 mm, and 0.40 mm, respectively. Accordingly, an image magnification M1 is 9.33, and an image magnification M3 is 1.12. The pitch P1' of the shadow of the light source grating pattern 14 projected on the light receiving element array 12 is 187 μm, and the pitch P3' of the shadow of the index grating pattern 15 is 24.6 μm. In addition, the pitch Pm of the moire fringes formed on the exit plane of the index grating pattern 15 is 229 µm, and the pitch Pm' of the moire fringes formed on the light receiving plane of the light receiving element array 12 is 256 µm.

A wavelength λ of the light source 11 is 650 nm, and the luminous flux divergence d3, which is caused by the first order diffracted light by the index grating pattern 15 propagating through the space from the index grating pattern 15 to the light receiving element array 12, is 23.7 µm. Accordingly, the ratio of the luminous flux divergence d3 to the pitch P3' of the shadow of the index grating pattern 15 projected on the light receiving plane of the light receiving element array 12 is 0.97. Thus, the high frequency components included in the second moire fringes are sufficiently smoothed. In other words, the distance between the index grating pattern 15 and the light receiving element array 12 is set so that the high frequency components included in the second moire fringes are smoothed.

The ratio of the luminous flux divergence d3 to the pitch Pm' of the moire fringes is 0.09. Thus, the moire fringes with a sufficiently high contrast are formed on the light receiving element array 12 without the moire fringes used for position detection being excessively smoothed.

The ratio of the pitch P1' of the shadow of the light source grating pattern 14 projected on the light receiving plane of the light receiving element array 12 to the width P4 of the aggregate of the light receiving elements is 0.73. Thus, the difference in amplitude between the A- and B-phases is decreased, and a signal waveform is stabilized regardless of a manufacturing error. In other words, the light receiving element array 12 receives light as the second moire fringes in a state in which the pitch P1' of the shadow of the light source grating pattern 14 is shifted with respect to a half pitch of the aggregate of the light receiving elements. The pitch of the light source grating pattern 14 is set to be shifted with respect to the half pitch of the aggregate of the light receiving elements.

Consequently, with the optical encoder to which the present example is applied, a compact optical encoder using a moire detection method that decreases the distortion or the individual difference of the incremental signal can be provided.

Second Example

In a second example, the pitch of the light source grating pattern 14 is 10 µm, the pitch of the scale pattern 21 is 10 µm, and the pitch of the index grating pattern 15 is 9.57 µm. In addition, the space distance from the cover glass plate 16 to the scale 20 is 0.7 mm, the thickness of the cover glass plate 16 is 05 mm, and the distance from the light source 11 and the light receiving element array 12 to the cover glass plate 16 is 0.6 mm. An optical encoder according to the second example can obtain an incremental signal having a pitch of 5 µm.

A refractive index of each of the cover glass plate 16 and the translucent resin 17 is 1.5, and effective optical path lengths of L0, L1, L2, and L3 are 0.40 mm, 103 mm, 1.03 mm, and 0.40 mm, respectively. Accordingly, the image magnification M1 is 7.17, and the image magnification M3 is 1.16. The pitch P1' of the shadow of the light source grating pattern 14 projected on the light receiving element array 12 is 71.7 µm, and the pitch P3' of the shadow of the index grating pattern 15 is 11.1 µm. In addition, the pitch Pm of the moire fringes formed on the exit plane of the index grating pattern 15 is 220 µm, and the pitch Pm' of the moire fringes formed on the light receiving plane of the light receiving element array 12 is 256 µm.

The wavelength λ of the light source 11 is 632 nm, and the luminous flux divergence d3, which is caused by the first order diffracted light by the index grating pattern 15 propagating through the space from the index grating pattern 15 to the light receiving element array 12, is 53.0 µm. Accordingly, the ratio of the luminous flux divergence d3 to the pitch P3' of the shadow of the index grating pattern 15 projected on the light receiving plane of the light receiving element array 12 is 4.8. Thus, the high frequency components included in the second moire fringes are sufficiently smoothed.

The ratio of the luminous flux divergence d3 to the pitch Pm' of the moire fringes is 0.21. Thus, the moire fringes with a sufficiently high contrast are formed on the light receiving element array 12 without the moire fringes used for position detection being excessively smoothed.

The ratio of the pitch P1' of the shadow of the light source grating pattern 14 projected on the light receiving plane of the light receiving element array 12 to the width P4 of the aggregate of the light receiving elements is 0.28. Thus, the difference in amplitude between the A- and B-phases is decreased, and a signal waveform is stabilized regardless of a manufacturing error.

Consequently, with the optical encoder to which the present example is applied, the compact optical encoder using the moire detection method that decreases the distortion or the individual difference of the incremental signal can be provided.

Third Example

In a third example, the pitch of the light source grating pattern 14 is 4 µm, the pitch of the scale pattern 21 is 4 µm, and the pitch of the index grating pattern 15 is 4.07 µm. In addition, the space distance from the cover glass plate 16 to the scale 20 is 0.7 mm, the thickness of the cover glass plate 16 is 05 mm, and the distance from the light source 11 and the light receiving element array 12 to the cover glass plate 16 is 0.5 mm. An optical encoder according to the third example can obtain an incremental signal having a pitch of 2 µm.

A refractive index of each of the cover glass plate 16 and the translucent resin 17 is 1.5, and effective optical path lengths of L0, L1, L2, and L3 are 0.33 mm, 103 mm, 1.03 mm, and 0.33 mm, respectively. Accordingly, the image magnification M1 is 8.20, and the image magnification M3 is 1.14. The pitch P1' of the shadow of the light source grating pattern 14 projected on the light receiving element array 12 is 32.8 µm, and the pitch P3' of the shadow of the index grating pattern 15 is 4.64 µm. In addition, the pitch Pm of the moire fringes formed on the exit plane of the index grating pattern 15 is 225 µm, and the pitch Pm' of the moire fringes formed on the light receiving plane of the light receiving element array 12 is 256 µm.

The wavelength λ of the light source 11 is 460 nm, and the luminous flux divergence d3, which is caused by the first order diffracted light by the index grating pattern 15 propagating through the space from the index grating pattern 15 to the light receiving element array 12, is 75.8 µm. Accordingly, the ratio of the luminous flux divergence d3 to the pitch P3' of the shadow of the index grating pattern 15 projected on the light receiving plane of the light receiving element array 12 is 16.3. Thus, the high frequency components included in the second moire fringes are sufficiently smoothed. The ratio of the luminous flux divergence d3 to the pitch Pm' of the moire fringes is 0.30. Thus, the moire fringes with a sufficiently high contrast are formed on the light receiving element array 12 without the moire fringes used for position detection being excessively smoothed.

The ratio of the pitch P1' of the shadow of the light source grating pattern 14 projected on the light receiving plane of the light receiving element array 12 to the width P4 of the aggregate of the light receiving elements is 0.13. Thus, the difference in amplitude between the A- and B-phases is decreased, and a signal waveform is stabilized regardless of a manufacturing error.

Consequently, with the optical encoder to which the present example is applied, the compact optical encoder using the moire detection method that decreases the distortion or the individual difference of the incremental signal can be provided.

The shadow of the grating pattern projected on the light receiving element array 12 can distort a waveform of an output signal from the light receiving element array 12. Specifically, in a case where a ratio of a distance D between centers of adjacent light receiving elements to a pitch P of the shadow of the grating pattern formed on the light receiving element array 12 is close to n−½ (n is a natural number), a distortion of a Lissajous figure becomes large.

Figure 11A:
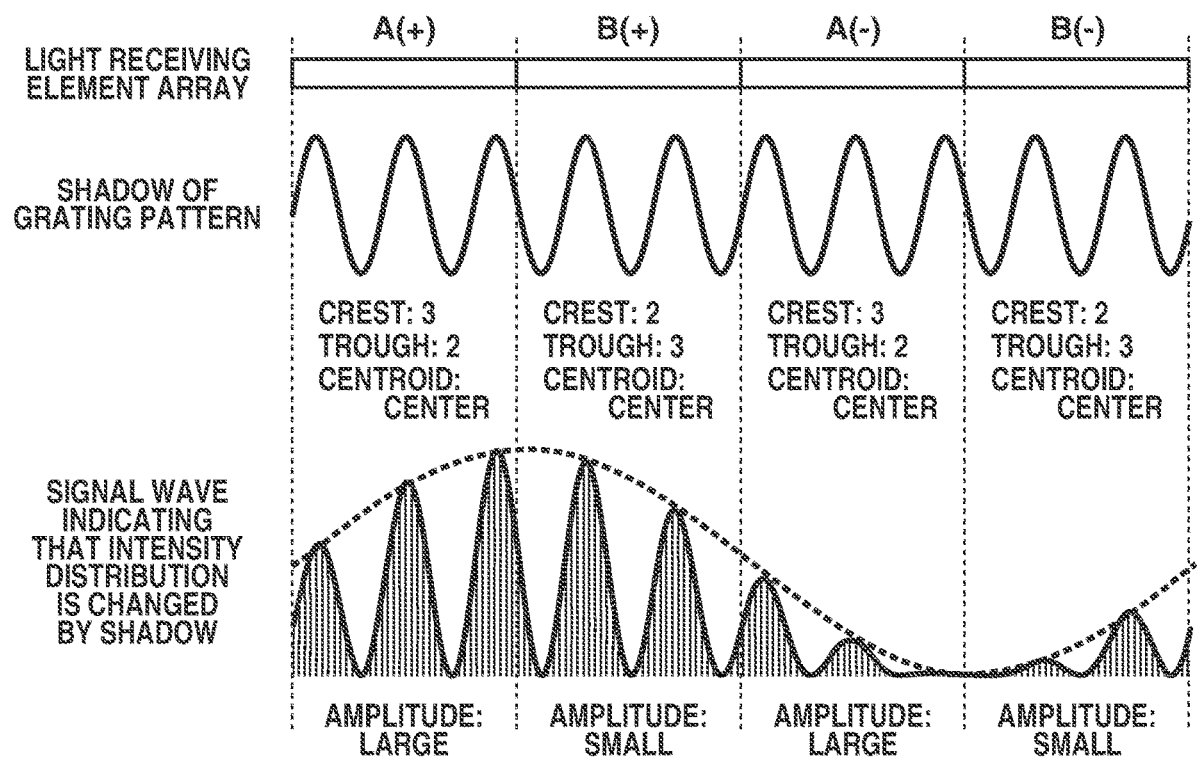
FIGS. 11A and 11B are diagrams each illustrating a relationship between a light receiving element array and a shadow of a grating pattern.
Figure 11B:
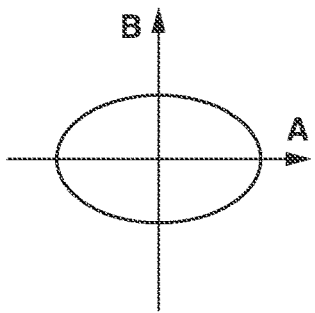

A description will be given of a reason for the above with reference to FIGS. 11A and 11B. FIGS. 11A, 11B, 12A, and 12B illustrate an example in which a ratio D/P of the distance D between the centers of the adjacent light receiving elements to the pitch P of the shadow of the grating pattern formed on the light receiving element array 12 is n−½ (n=3), i.e., 2.5.

When phases of the shadow of the grating pattern with respect to the light receiving elements are in a state illustrated in FIG. 11A, there are three crests (parts that exhibit local maximum illuminance by transmission of light) and two troughs (parts that exhibit local minimum illuminance by light shielding) of the shadow of the grating pattern in each of the light receiving elements in the A(+) and A(−)-phases. In contrast, there are two crests and three troughs of the shadow of the grating pattern in each of the light receiving elements in the B(+) and B(−)-phases. Accordingly, intensities of light (amounts of light) incident on the light receiving elements in the A(+) and A(−)-phases become higher than intensities of light (amounts of light) incident on the light receiving elements in the B(+) and B(−)-phases. Thus, an amplitude of a signal wave detected by each of the light receiving elements in the A(+) and A(−)-phases is larger than an amplitude of a signal wave detected by each of the light receiving elements in the B(+) and B(−)-phases. As a result, as illustrated in FIG. 11B, the Lissajous figure is not a perfect circle, but is distorted to be an ellipse having a major axis in a 0° direction.

Figure 12A:
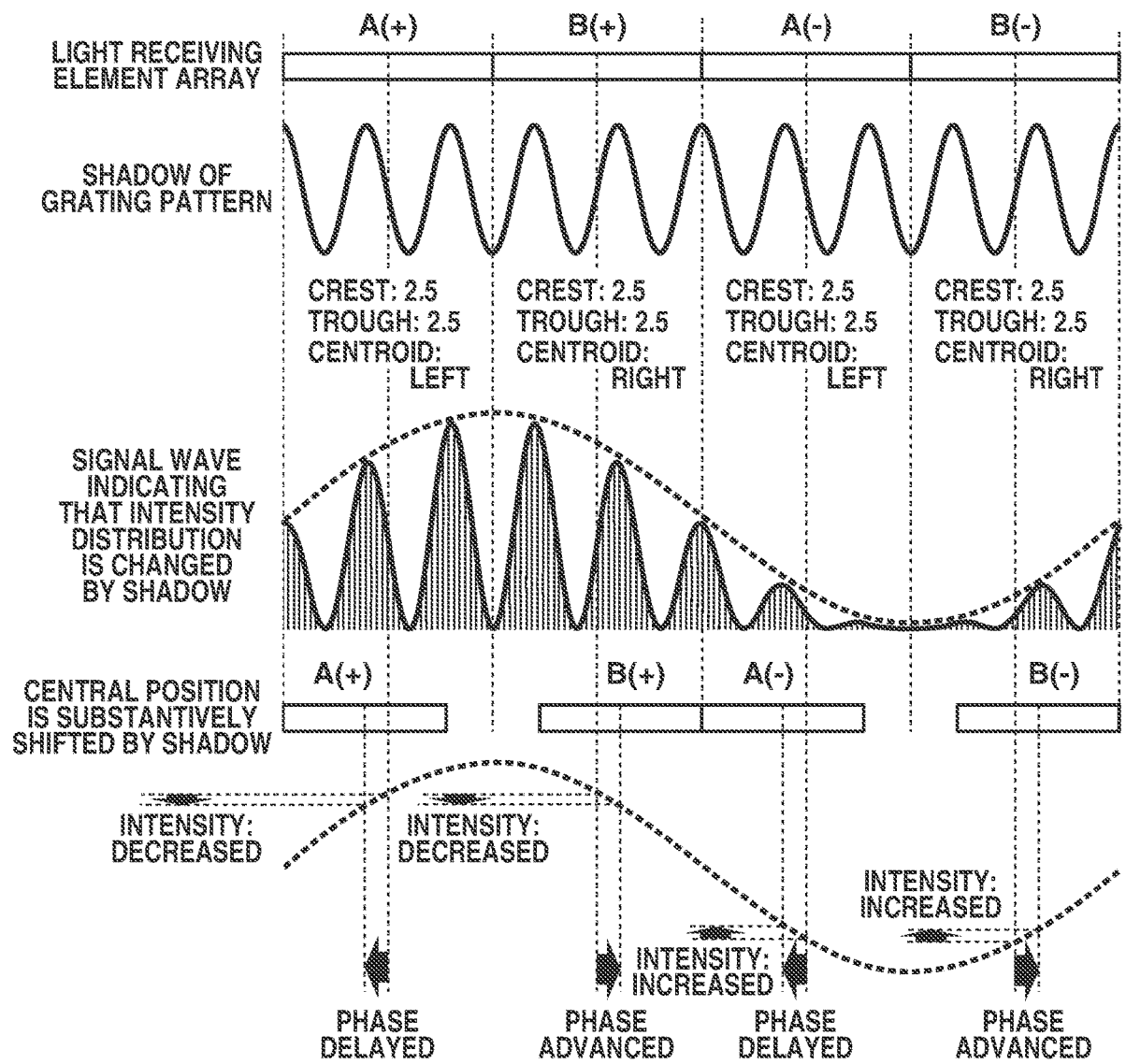
FIGS. 12A and 12B are diagrams each illustrating a relationship between the light receiving element array and the shadow of the grating pattern.

In contrast, when the phases of the shadow of the grating pattern with respect to the light receiving elements are in a state illustrated in FIG. 12A, there are two and a half crests and two and a half troughs of the shadow of the grating pattern in each of the light receiving elements in the A(+) and A(−)-phases. There are two and a half crests and two and a half troughs of the shadow of the grating pattern also in each of the light receiving elements in the B(+) and B(−)-phases. This makes an amplitude of the A-phase and that of the B-phase equal to each other.

In this state, the centroid of the intensity distribution of the shadow is on the left side in each of the light receiving elements in the A(+) and A(−)-phases, while the centroid of the intensity distribution of the shadow is on the right side in each of the light receiving elements in the B(+) and B(−)-phases. Accordingly, the state is substantially equivalent to a state in which the light receiving elements in the A(+) and A(−)-phases are arranged on the left side and the light receiving elements in the B(+) and B(−)-phases are arranged on the right side. When the signal wave is in the state as illustrated in FIG. 12A, shifting of the light receiving element in the A(+)-phase to the left side decreases the intensity of received light, thereby delaying the phase. In contrast, shifting of the light receiving element in the B(+)-phase to the right side decreases the intensity of received light, thereby advancing the phase. Similarly, shifting of the light receiving element in the A(−)-phase to the left side increases the intensity of received light, thereby delaying the phase. Shifting of the light receiving element in the B(−)-phase to the right side decreases the intensity of received light, thereby advancing the phase.

Figure 12B:
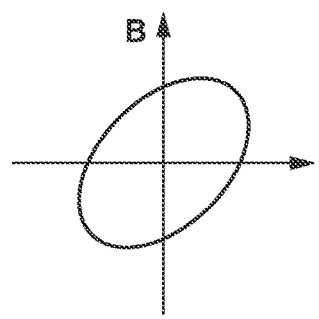

In conclusion, the phases of the signal wave detected by the light receiving elements in the A(+) and A(−)-phases are delayed compared to a case where there is no shadow, and the phases of the signal wave detected by the light receiving elements in the B(+) and B(−)-phases are advanced compared to the case where there is no shadow. As a result, a phase difference between the A- and B-phases changes from 90°, and thus the Lissajous figure is distorted to be an ellipse having a major axis in a 45° direction as illustrated in FIG. 12B.

Misalignment of the cover glass plate 16 due to a manufacturing error changes the positions of the light source grating pattern 14 and the index grating pattern 15 with respect to the light receiving element array 12. As a result, the shadow of the grating pattern projected on the light receiving element array 12 also changes. Thus, a variation in the position of the cover glass plate 16 can cause a large individual difference in signal waveform. In addition, if the shadow of the grating pattern is shifted with respect to the light receiving elements due to an environmental factor such as a temperature, the signal waveform changes.

In an optical encoder to which a second exemplary embodiment is applied, at least one of the light source grating pattern 14 and the index grating pattern 15 satisfies the following condition. The condition is that the ratio D/P of the distance D between the centers of the adjacent light receiving elements to the pitch P of the shadow of the grating pattern formed on the light receiving element array 12 is within a range of n−¼ to n+¼ inclusive (n is any natural number).

Figure 13A:
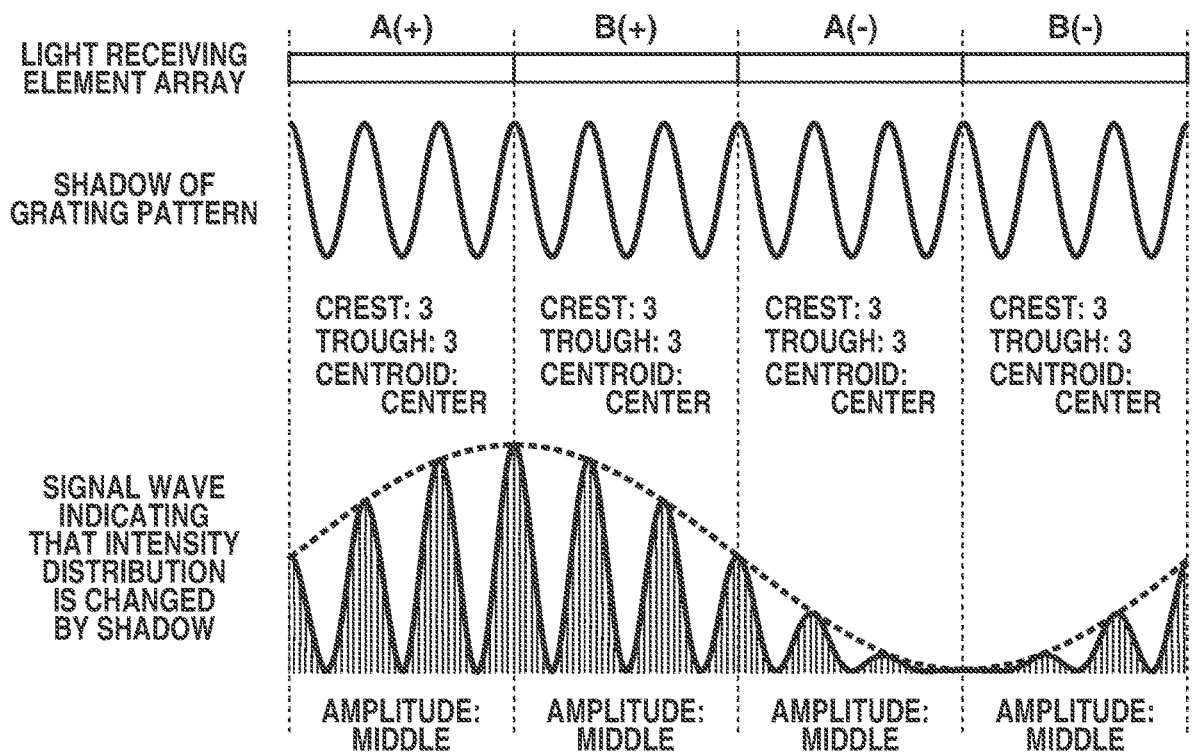
FIGS. 13A and 13B are diagrams each illustrating a relationship between the light receiving element array and the shadow of the grating pattern.
Figure 13B:
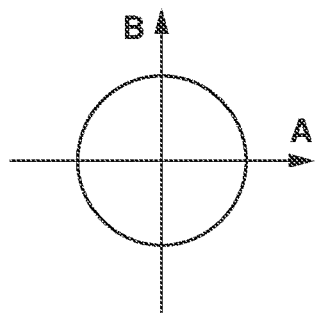

FIGS. 13A and 13B illustrate an example where the ratio of the distance between the centers of the adjacent light receiving elements to the pitch of the shadow of the grating pattern formed on the light receiving element array 12 is three. In this case, the condition that the ratio is within the range of n−¼ to n+¼ inclusive where n=3, i.e., within the range of 2.75 to 3.25 inclusive, is satisfied.

When phases of the shadow of the grating pattern with respect to the light receiving elements are in a state illustrated in FIG. 13A, there are three crests and three troughs of the shadow of the grating pattern in each of the light receiving elements in the A(+) and A(−)-phases, and there are three crests and three troughs of the shadow of the grating pattern also in each of the light receiving elements in the B(+) and B(−)-phases. Accordingly, light incident on the light receiving elements in the A(+) and A(−)-phases becomes the same level as light incident on the light receiving elements in the B(+) and B(−)-phases. Thus, an amplitude of the signal wave detected by each of the light receiving elements in the A(+) and A(−)-phases becomes the same level as an amplitude of the signal wave detected by each of the light receiving elements in the B(+) and B(−)-phases. This makes the amplitude of the A-phase signal and that of the B-phase signal nearly equal to each other, and the Lissajous figure becomes closer to a perfect circle, as illustrated in FIG. 13B.

Figure 14A:
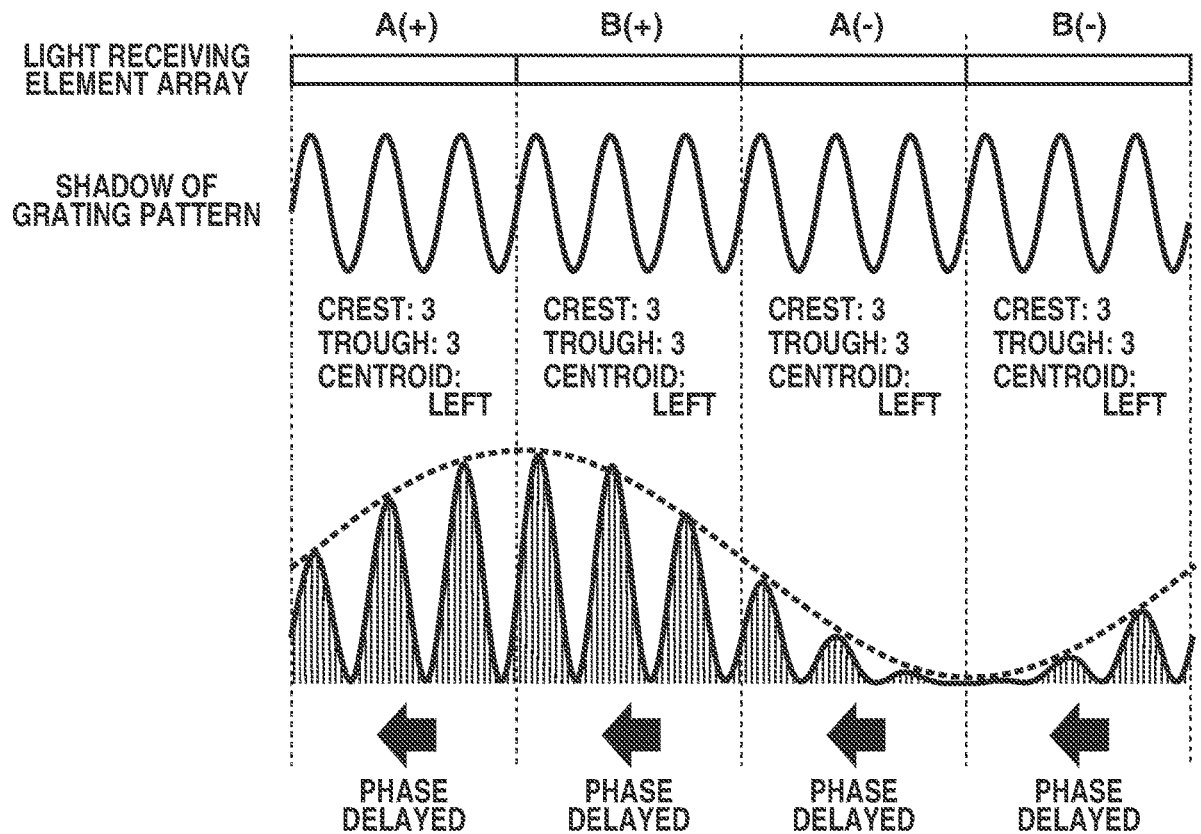
FIGS. 14A and 14B are diagrams each illustrating a relationship between the light receiving element array and the shadow of the grating pattern.
Figure 14B:
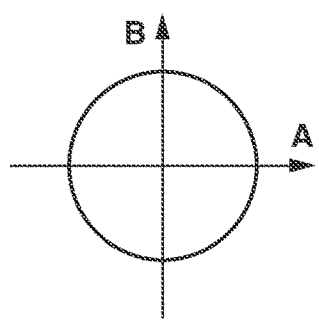

When phases of the shadow of the grating pattern with respect to the light receiving elements are in a state illustrated in FIG. 14A, there are three crests and three troughs of the shadow of the grating pattern in each of the light receiving elements in the A(+) and A(−)-phases, and there are three crests and three troughs of the shadow of the grating pattern also in each of the light receiving elements in the B(+) and B(−)-phases. Accordingly, light incident on the light receiving elements in the A(+) and A(−)-phases becomes the same level as light incident on the light receiving elements in the B(+) and B(−)-phases. In addition, the centroid of the intensity distribution of the shadow of the grating pattern is on the left side in each of the light receiving elements in the A(+) and A(−)-phases, and the centroid of the intensity distribution of the shadow of the grating pattern is also on the left side in each of the light receiving elements in the B(+) and B(−)-phases. Thus, all the phases of the signal wave detected by the light receiving elements in the four phases are delayed compared to the case where there is no shadow of the grating pattern, but a phase difference between signals detected by the adjacent light receiving elements is maintained at approximately 90°. As a result, the A-phase signal and the B-phase signal become nearly equal to each other in amplitude, and the phase difference becomes substantially 90°. Thus, the Lissajous figure becomes closer to a perfect circle, as illustrated in FIG. 14B.

A description will be given of a third exemplary embodiment in which shifting the phases of the shadow of the grating pattern between the plurality of light receiving elements can decrease the distortion of the Lissajous figure, with reference to FIG. 15.

Figure 15:
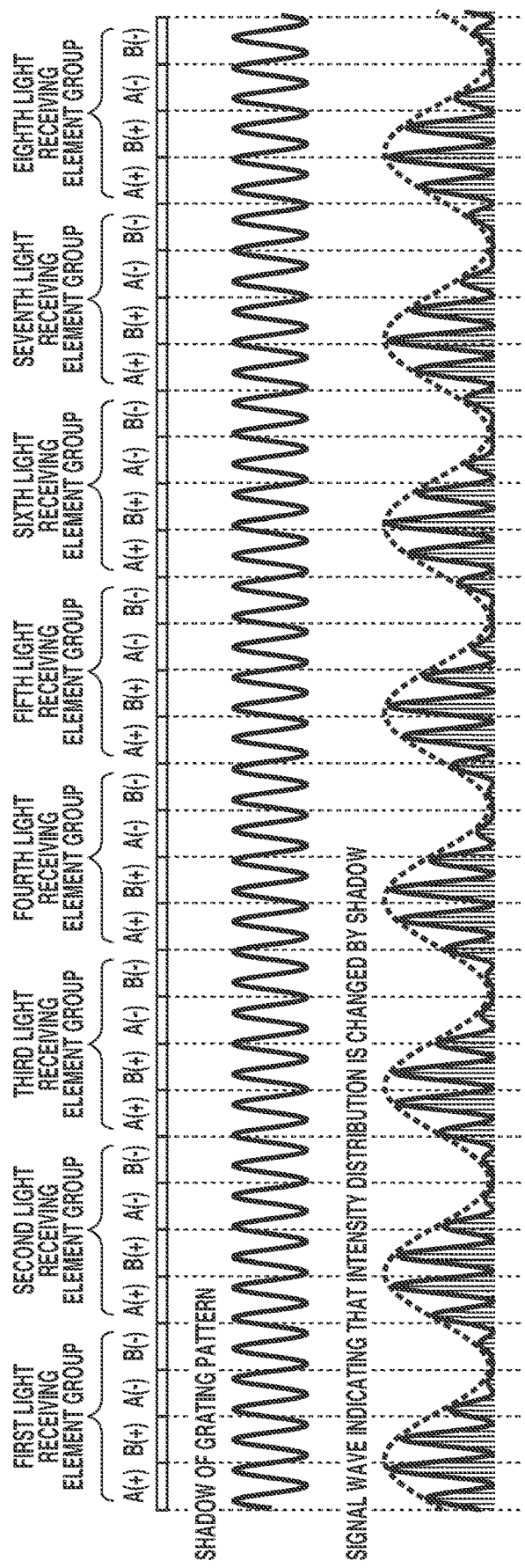
FIG. 15 is a diagram illustrating a relationship between a plurality of light receiving element groups and the shadow of the grating pattern.

FIG. 15 is a diagram illustrating a relationship among the light receiving element array 12, the shadow of the grating pattern, and a signal waveform. The light receiving element array 12 according to the present exemplary embodiment is composed of eight light receiving element groups from first to eighth light receiving element groups. For example, the second light receiving element group is arranged between and adjacent to the first and third light receiving element groups. Each of the light receiving element groups is composed of the light receiving elements in the A(+), B(+), A(−), and B(−)-phases. The B(+)-phase is arranged between and adjacent to the A(+) and A(−)-phases. The A(−)-phase is arranged between and adjacent to the B(+) and B(−)-phases.

FIG. 15 illustrates an example in which the ratio D/P of the distance D between the centers of the adjacent light receiving elements to the pitch P of the shadow of the grating pattern formed on the light receiving element array 12 is 1.53125 (the pitch of the shadow of the grating pattern corresponds to 41.796 μm). This value fails to satisfy the condition that the ratio D/P is within the range of n−¼ to n+¼ inclusive (n is a natural number).

Figures 16A, 16B, 16C, 16D, 16E, 16F, 16G, 16H:
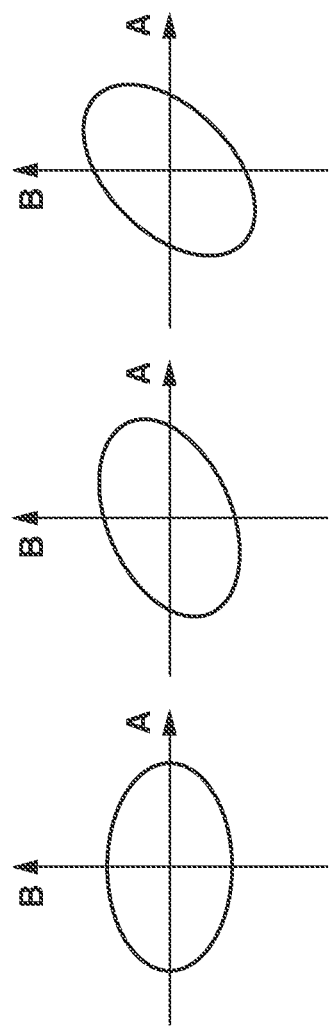
FIGS. 16A to 16H are diagrams each illustrating a Lissajous figure.

Paying attention to the first light receiving element group, there are two crests and one trough of the shadow of the grating pattern in each of the light receiving elements in the A(+) and A(−)-phases, while there are one crest and two troughs of the shadow of the grating pattern in each of the light receiving elements in the B(+) and B(−)-phases. Accordingly, an intensity of light incident on each of the light receiving elements in the A(+) and A(−)-phases is greater than an intensity of light incident on each of the light receiving elements in the B(+) and B(−)-phases. Thus, the amplitude of signal wave detected by each of the r light receiving elements in the A(+) and A(−)-phases becomes large, while the amplitude of signal wave detected by each of the light receiving elements in the B(+) and B(−)-phases becomes small. As a result, if an incremental signal is detected only by the first light receiving element group, the Lissajous figure is distorted to be an ellipse having a major axis in a 0° direction as illustrated in FIG. 16A.

The ratio of the distance between the centers of the adjacent light receiving elements to the pitch of the shadow of the grating pattern formed on the light receiving element array 12 does not completely match n−½ (n is a natural number). For this reason, the phases of the shadow of the grating pattern are shifted between the first light receiving element group and the other light receiving element groups.

A phase difference $\Delta\Phi$ of the shadow of the grating pattern between adjacent light receiving element groups is represented by the following Formula (11). In the formula, PD represents a distance between centers of the adjacent light receiving element groups, V represents a pitch of the shadow of the grating pattern on the light receiving element array 12, and round(x) represents a function for rounding off fractions to whole numbers.

Formula 11

$$\Delta\Phi = 2\pi \frac{P_D - P' \text{round}\left(\frac{P_D}{P'}\right)}{P'} \quad (11)$$

For example, in a case where the pitch of the shadow of the grating pattern is 41.796 μm, the phase difference of the shadow of the grating pattern between the adjacent light receiving element groups is π/4. Accordingly, the phases of the shadow of the grating pattern in the m-th (m=1 to 8) light receiving element group are shifted by π/4(m−1).

In this example, the phases of the shadow of the grating pattern are shifted by 7E in the fifth light receiving element group. In other words, the phases of the shadow of the grating pattern are reversed between the first and fifth light receiving element groups. Thus, paying attention to the fifth light receiving element group, there are one crest and two troughs of the shadow of the grating pattern in each of the light receiving elements in the A(+) and A(−)-phases, while there are two crests and one trough of the shadow of the grating pattern in each of the light receiving elements in the B(+) and B(−)-phases. Accordingly, an intensity of light incident on each of the light receiving elements in the A(+) and A(−)-phases is less than an intensity of light incident on each of the light receiving elements in the B(+) and B(−)-phases. Thus, the amplitude of signal wave detected by each of the light receiving elements in the A(+) and A(−)-phases becomes small, while the amplitude of signal wave detected by each of the light receiving elements in the B(+) and B(−)-phases becomes large. As a result, if an incremental signal is detected only by the fifth light receiving element group, the Lissajous figure is distorted to be an ellipse having a major axis in a 90° direction as illustrated in FIG. 16E.

The Lissajous figure in a case where the increment signal is detected only by the first light receiving element group is an ellipse that is long in a horizontal direction, while the Lissajous figure in a case where the increment signal is detected only by the fifth light receiving element group is an ellipse that is long in vertical direction. Consequently, by combining both of the signals by the light receiving IC 13, a signal having the Lissajous figure close to a perfect circle can be obtained.

Subsequently, paying attention to the third light receiving element group, the phases of the shadow of the grating pattern are shifted by $\pi/2$. There are one and a half crests and one and a half troughs of the shadow of the grating pattern in each of the light receiving elements in the A(+) and A(−)-phases, and there are one and a half crests and one and a half troughs of the shadow of the grating pattern also in each of the light receiving elements in the B(+) and B(−)-phases. However, the centroid of the intensity distribution of the shadow of the grating pattern is on the left side in each of the light receiving elements in the A(+) and A(−)-phases, while the centroid of the intensity distribution of the shadow of the grating pattern is on the right side in each of the light receiving elements in the B(+) and B(−)-phases. Accordingly, the center of sensitivity of each of the light receiving elements in the A(+) and A(−)-phases is on the left side, and the center of sensitivity of each of the light receiving elements in the B(+) and B(−)-phases is on the right side. This state is substantially equivalent to a state in which each of the light receiving elements in the A(+) and A(−)-phases having uniform sensitivity is arranged on the left side, and each of the light receiving elements in the B(+) and B(−)-phases having uniform sensitivity is arranged on the right side. Accordingly, the phases of the signal wave detected by the light receiving elements in the A(+) and A(−)-phases are delayed, and the phases of the signal wave detected by the light receiving elements in the B(+) and B(−)-phases are advanced. As a result, a phase difference between the A- and B-phases changes from 90°, and thus the Lissajous figure is distorted to be an ellipse having a major axis in a 45° direction as illustrated in FIG. 16C.

Subsequently, paying attention to the seventh light receiving element group, the phases of the shadow of the grating pattern are shifted by $3\pi/2$. There are one and a half crests and one and a half troughs of the shadow of the grating pattern in each of the light receiving elements in the A(+) and A(−)-phases, and there are one and a half crests and one and a half troughs of the shadow of the grating pattern also in each of the light receiving elements in the B(+) and B(−)-phases. However, the centroid of the intensity distribution of the shadow of the grating pattern is on the right side in each of the light receiving elements in the A(+) and A(−)-phases, while the centroid of the intensity distribution of the shadow of the grating pattern is on the left side in each of the light receiving elements in the B(+) and B(−)-phases. Accordingly, the center of sensitivity of each of the light receiving elements in the A(+) and A(−)-phases is on the right side, and the center of sensitivity of each of the light receiving elements in the B(+) and B(−)-phases is on the left side. This state is substantially equivalent to a state in which each of the light receiving elements in the A(+) and A(−)-phases having uniform sensitivity is arranged on the right side, and each of the light receiving elements in the B(+) and B(−)-phases having uniform sensitivity is arranged on the left side. Accordingly, the phases of the signal wave detected by the light receiving elements in the A(+) and A(−)-phases are advanced, and the phases of the signal wave detected by the light receiving elements in the B(+) and B(−)-phases are delayed. As a result, a phase difference between the A- and B-phases changes from 90°, and thus the Lissajous figure is distorted to be an ellipse having a major axis in a 135° direction as illustrated in FIG. 16G.

The Lissajous figure in a case where the increment signal is detected only by the third light receiving element group is an ellipse having a major axis in a 45° direction, while the Lissajous figure in a case where the increment signal is detected only by the seventh light receiving element group is an ellipse having a major axis in a 135° direction. Consequently, by combining both of the signals by the light receiving IC 13, a signal having the Lissajous figure close to a perfect circle can be obtained.

Paying attention to the second light receiving element group, the phases of the shadow of the grating pattern are shifted by $\pi/4$. This is an intermediate value between the shift amount of the first light receiving element group and the shift amount of the third light receiving element group. Accordingly, the Lissajous figure becomes an ellipse having a major axis in a 22.5° direction as illustrated in FIG. 16B. Similarly, paying attention to the sixth light receiving element group, the phases of the shadow of the grating pattern are shifted by $5\pi/4$. This is an intermediate value between the shift amount of the fifth light receiving element group and the shift amount of the seventh light receiving element group. Accordingly, the Lissajous figure becomes an ellipse having a major axis in a 112.5° direction as illustrated in FIG. 16F. By combining both of the signals of the second and sixth light receiving element groups by the light receiving IC 13, a signal having the Lissajous figure close to a perfect circle can be obtained.

The Lissajous figure formed by the fourth light receiving element group is an ellipse as illustrated in FIG. 16D. The Lissajous figure formed by the eighth light receiving element group is an ellipse as illustrated in FIG. 16H. Consequently, by combining both of the signals of the fourth and eighth light receiving element groups by the light receiving IC 13, a signal having the Lissajous figure close to a perfect circle can be obtained.

As described above, by combining the signals of the two different light receiving element groups in which the phases of the shadow of the grating pattern are reversed from each other (the first and fifth light receiving element groups, the second and sixth light receiving element groups, the third and seventh light receiving element groups, and the fourth and eighth light receiving element groups), a signal having the Lissajous figure close to a perfect circle can be obtained.

An index I represented by the following Formula (12) is defined here. In the formula, PD represents a distance between the centers of the adjacent light receiving element groups, V represents a pitch of the shadow of the grating pattern on the light receiving element array 12, round(x) represents a function for rounding off fractions to whole numbers, and N represents the number of light receiving element groups.

Formula 12

$$I \equiv \left| \frac{P_D - P' \text{round}\left(\frac{P_D}{P'}\right)}{P'} N \right| \quad (12)$$

In the formula, the index I represents how different the phases of the shadow of the grating pattern are between the different light receiving element groups. In a case where I=0, the shadow of the grating pattern is in the same phase between all of the light receiving element groups. In a case where I=1, the shadow of the grating pattern is in a reversed phase between the m-th light receiving element group and the (N/2+m)-th light receiving element group. For example, in a case where I=1 and the number N of the light receiving element groups is eight, the shadow of the grating pattern is in the reversed phase between the first and fifth light receiving element groups, the second and sixth light receiving element groups, the third and seventh light receiving element groups, and the fourth and eighth light receiving element groups. In a case where I=2, the shadow of the grating pattern is in the reversed phase between the m-th light receiving element group and the (N/4+m)-th light receiving element group. For example, in the case where I=2, and the number N of the light receiving element groups is eight, the shadow of the grating pattern is in the reversed phase between the first and third light receiving element groups, the second and fourth light receiving element groups, the fifth and seventh light receiving element groups, and the sixth and eighth light receiving element groups.

Figure 17:
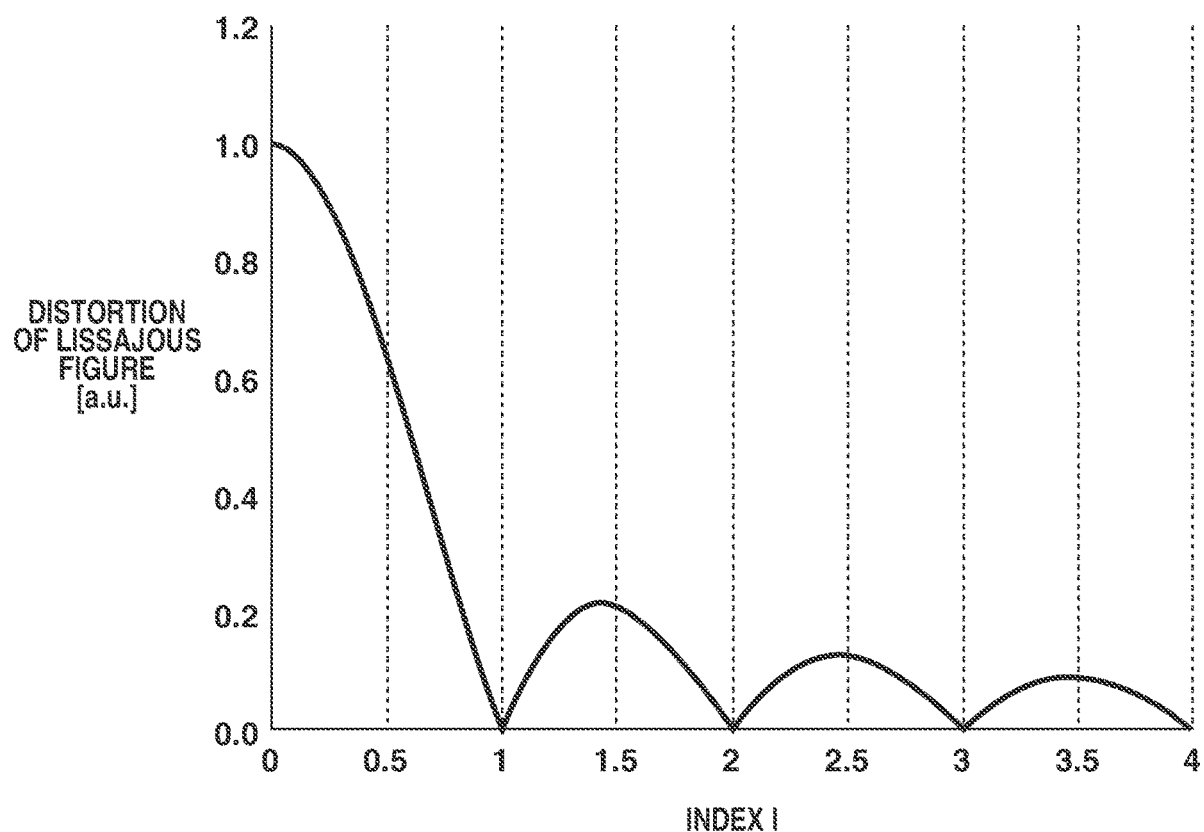
FIG. 17 is a diagram illustrating a relationship between an index I and a distortion of the Lissajous figure.

FIG. 17 is a graph illustrating a result of calculating how the distortion of the Lissajous figure changes with the index I. In a case where I=0, i.e., the shadow of the grating pattern is in the same phase for all the light receiving element groups, the distortion of the Lissajous figure is large. In a case where I is an integer, the shadow of the grating pattern is in the reversed phase between the different light receiving element groups, so that the distortion of the Lissajous figure becomes zero. Outputs from the plurality of light receiving element groups are combined under the condition I≥¾, thereby the distortion of the Lissajous figure is decreased to lower than or equal to 30% in comparison with a case where there is only one light receiving element group (I=0). In the optical encoder to which the present exemplary embodiment is applied, at least one of the light source grating pattern and the index grating pattern satisfies the condition I≥¾.

In the second and third exemplary embodiments, the light receiving element array 12 outputs signals in four phases that are mutually different by approximately 90°. However, the light receiving element array 12 is not limited to such a configuration, and may output signals in three phases (A-, B-, and C-phases) that are mutually different by approximately 120°.

Fourth Example

In a fourth example, the pitch of the light source grating pattern 14 is 6 μm, the pitch of the scale pattern 21 is 6 μm, and the pitch of the index grating pattern 15 is 5.85 μm. In addition, the space distance from the cover glass plate 16 to the scale 20 is 1.2 mm, the thickness of the cover glass plate 16 is 10 mm, and the distance from the light source 11 and the light receiving element array 12 to the cover glass plate 16 is 0.6 mm. An optical encoder according to the fourth example can obtain an incremental signal having a pitch of 3 μm.

A refractive index of each of the cover glass plate 16 and the translucent resin 17 is 1.5, and effective optical path lengths of L0, L1, L2, and L3 are 0.40 mm, 187 mm, 1.87 mm, and 0.40 mm, respectively. Accordingly, the image magnification M1 is 11.33, and the image magnification M3 is 1.10. The pitch P'1 of the shadow of the light source grating pattern 14 projected on the light receiving element array 12 is 68.0 μm, and the pitch P'3 of the shadow of the index grating pattern 15 is 6.42 μm. In addition, the pitch Pm of the moire fringes formed on the exit plane of the index grating pattern 15 is 233.4 μm, and the pitch Pm of the second moire fringes formed on a detection plane of the light receiving element array 12 is 256 μm.

Due to a manufacturing error or the like, effective optical path lengths of L1 and L2 each have a tolerance of ±0.15 mm, and effective optical path lengths of L0 and L3 each have a tolerance of ±0.033 mm Table 1 indicates a value of the ratio D/P of the distance D between the centers of the adjacent light receiving elements to the pitch P of the shadow of the light source grating pattern 14 formed on the light receiving element array 12 within a range of the manufacturing error. The ratio D/P is within a range of 0.82 to 1.07, which satisfies the condition that the ratio D/P is within the range of n−¼ to n+¼ inclusive (n is a natural number).

TABLE 1

|  |  | L0, L3 | | |
| --- | --- | --- | --- | --- |
|  |  | −0.033 mm | ±0 mm | +0.033 mm |
| L1, L2 | −0.15 mm | 0.94 | 1.01 | 1.07 |
|  | ±0 mm | 0.88 | 0.94 | 1.00 |
|  | +0.15 mm | 0.82 | 0.88 | 0.94 |

TABLE 2

|  |  | L0, L3 | | |
| --- | --- | --- | --- | --- |
|  |  | −0.033 mm | ±0 mm | +0.033 mm |
| L1, L2 | −0.15 mm | 9.98 | 9.91 | 9.84 |
|  | ±0 mm | 10.04 | 9.98 | 9.91 |
|  | +0.15 mm | 10.10 | 10.04 | 9.97 |

Table 2 indicates a value of the ratio D/P of the distance D between the centers of the adjacent light receiving elements to the pitch P of the shadow of the index grating pattern 15 formed on the light receiving element array 12 within the range of the manufacturing error described above. The ratio D/P is within a range of 9.84 to 10.10, which satisfies the condition that the ratio D/P is within the range of n−¼ to n+¼ inclusive (n is a natural number). In this manner, each of the light source grating pattern 14 and the index grating pattern 15 satisfies the following condition. More specifically, the ratio of the distance between the centers of the adjacent light receiving elements to the pitch of the shadow of the grating pattern formed on the light receiving element array 12 is within the range of n−¼ to n+¼ inclusive (n is a natural number). Thus, the distortion of the Lissajous figure is decreased even if a manufacturing error occurs.

With the optical encoder to which the present example is applied, the compact optical encoder using the moire detection method that decreases the distortion or the individual difference of the incremental signal can be provided.

Fifth Example

In a fifth example, the pitch of the light source grating pattern 14 is 16 μm, the pitch of the scale pattern 21 is 16 μm, and the pitch of the index grating pattern 15 is 17.18 μm. In addition, the space distance from the cover glass plate 16 to the scale 20 is 1.0 mm, the thickness of the cover glass plate 16 is 0.7 mm, and the distance from the light source 11 and the light receiving element array 12 to the cover glass plate 16 is 0.5 mm. An optical encoder according to the fifth example can obtain an incremental signal having a pitch of 8 μm.

A refractive index of each of the cover glass plate 16 and the translucent resin 17 is 1.5, and effective optical path lengths of L0, L1, L2, and L3 are 0.33 mm, 147 mm, 1.47 mm, and 0.33 mm, respectively. Accordingly, the image magnification M1 is 10.8, and the image magnification M3 is 1.10. The pitch P'1 of the shadow of the light source grating pattern 14 projected on the light receiving element array 12 is 172.8 μm, and the pitch P'3 of the shadow of the index grating pattern 15 is 18.94 μm. In addition, the pitch Pm of the first moire fringes formed on the exit plane of the index grating pattern 15 is 232.3 μm, and the pitch P'm of the second moire fringes formed on the detection plane of the light receiving element array 12 is 256 μm.

Due to a manufacturing error or the like, effective optical path lengths of L1 and L2 each have a tolerance of ±0.15 mm, and effective optical path lengths of L0 and L3 each have a tolerance of ±0.067 mm Table 3 indicates a value of the ratio D/P of the distance D between the centers of the adjacent light receiving elements to the pitch P of the shadow of the light source grating pattern 14 formed on the light receiving element array 12 within a range of the manufacturing error. The ratio D/P is within a range of 0.28 to 0.47, which does not satisfy the condition that the ratio D/P is within the range of n−¼ to n+¼ inclusive (n is a natural number).

TABLE 3

|  |  | L0, L3 | | |
| --- | --- | --- | --- | --- |
|  |  | −0.067 mm | ±0 mm | +0.067 mm |
| L1, L2 | −0.15 mm | 0.34 | 0.40 | 0.47 |
|  | ±0 mm | 0.31 | 0.37 | 0.43 |
|  | +0.15 mm | 0.28 | 0.34 | 0.40 |

TABLE 4

|  |  | L0, L3 | | |
| --- | --- | --- | --- | --- |
|  |  | −0.067 mm | ±0 mm | +0.067 mm |
| L1, L2 | −0.15 mm | 3.41 | 3.35 | 3.29 |
|  | ±0 mm | 3.44 | 3.38 | 3.33 |
|  | +0.15 mm | 3.46 | 3.41 | 3.36 |

Table 4 indicates a value of the ratio D/P of the distance D between the centers of the adjacent light receiving elements to the pitch P of the shadow of the index grating pattern 15 formed on the light receiving element array 12 within the range of the manufacturing error described above. The ratio D/P is within a range of 3.29 to 3.46, which does not satisfy the condition that the ratio D/P is within the range of n−¼ to n+¼ inclusive (n is a natural number). In this manner, neither the light source grating pattern 14 nor the index grating pattern 15 satisfies the condition that the ratio of the distance between the centers of the adjacent light receiving elements to the pitch of the shadow of the grating pattern formed on the light receiving element array 12 is within the range of n−¼ to n+¼ inclusive (n is a natural number). For this reason, in a case where an incremental signal is detected by a single light receiving element group, the Lissajous figure can be distorted.

TABLE 5

|  |  | L0, L3 | | |
| --- | --- | --- | --- | --- |
|  |  | −0.067 mm | ±0 mm | +0.067 mm |
| L1, L2 | −0.15 mm | 2.78 | 3.07 | 1.09 |
|  | ±0 mm | 1.85 | 3.85 | 2.29 |
|  | +0.15 mm | 1.06 | 2.94 | 3.31 |

TABLE 6

|  |  | L0, L3 | | |
| --- | --- | --- | --- | --- |
|  |  | −0.067 mm | ±0 mm | +0.067 mm |
| L1, L2 | −0.15 mm | 2.71 | 3.00 | 0.88 |
|  | ±0 mm | 1.71 | 3.85 | 2.16 |
|  | +0.15 mm | 0.87 | 2.88 | 3.25 |

Table 5 indicates a value of the index I regarding the shadow of the light source grating pattern 14 formed on the light receiving element array 12 within the range of the manufacturing error described above. The value of the index I is within a range of 1.06 to 3.85, which satisfies the condition of I≥¾. Table 6 indicates a value of the index I regarding the shadow of the index grating pattern 15 formed on the light receiving element array 12 within the range of the manufacturing error described above. The value of the index I is within a range of 0.87 to 3.85, which satisfies the condition I≥¾.

In this manner, each of the light source grating pattern 14 and the index grating pattern 15 satisfies the condition I≥¾, so that the phases of the shadow of the grating pattern between the different light receiving element groups are shifted. Thus, the distortion of the Lissajous figure is decreased even if a manufacturing error occurs.

Consequently, with the optical encoder to which the present example is applied, the compact optical encoder using the moire detection method that decreases the distortion or the individual difference of the incremental signal can be provided.

Sixth Example

In a sixth example, the pitch of the light source grating pattern 14 is 20 μm, the pitch of the scale pattern 21 is 20 μm, and the pitch of the index grating pattern 15 is 18.37 μm. In addition, the space distance from the cover glass plate 16 to the scale 20 is 1.0 mm, the thickness of the cover glass plate 16 is 0.7 mm, and the distance from the light source 11 and the light receiving element array 12 to the cover glass plate 16 is 0.7 mm. An optical encoder according to the sixth example can obtain an incremental signal having a pitch of 10 μm.

A refractive index of each of the cover glass plate 16 and the translucent resin 17 is 1.5, and effective optical path lengths of L0, L1, L2, and L3 are 0.47 mm, 1.47 mm, 1.47 mm, and 0.47 mm, respectively. Accordingly, the image magnification M1 is 8.29, and the image magnification M3 is 1.14. The pitch P'1 of the shadow of the light source grating pattern 14 projected on the light receiving element array 12 is 165.7 μm, and the pitch P'3 of the shadow of the index grating pattern 15 is 20.9 μm. In addition, the pitch Pm of the first moire fringes formed on the exit plane of the index grating pattern 15 is 225.1 μm, and the pitch P'm of the second moire fringes formed on the detection plane of the light receiving element array 12 is 256 μm.

Due to a manufacturing error or the like, effective optical path lengths of L1 and L2 each have a tolerance of ±0.15 mm, and effective optical path lengths of L0 and L3 each have a tolerance of ±0.067 mm Table 7 indicates a value of the ratio of the distance between the centers of the adjacent light receiving elements to the pitch of the shadow of the light source grating pattern 14 formed on the light receiving element array 12 within the range of the manufacturing error. The ratio is within a range of 0.32 to 0.46, which does not satisfy the condition that the ratio is within the range of n−¼ to n+¼ inclusive (n is a natural number). For this reason, in a case where an incremental signal is detected by a single light receiving element group, the Lissajous figure can be distorted.

TABLE 7

|  |  | L0, L3 | | |
| --- | --- | --- | --- | --- |
|  |  | −0.067 mm | ±0 mm | +0.067 mm |
| L1, L2 | −0.15 mm | 0.37 | 0.42 | 0.46 |
|  | ±0 mm | 0.34 | 0.39 | 0.43 |
|  | +0.15 mm | 0.32 | 0.36 | 0.40 |

TABLE 8

|  |  | L0, L3 | | |
| --- | --- | --- | --- | --- |
|  |  | −0.067 mm | ±0 mm | +0.067 mm |
| L1, L2 | −0.15 mm | 3.08 | 3.03 | 2.98 |
|  | ±0 mm | 3.11 | 3.06 | 3.02 |
|  | +0.15 mm | 3.14 | 3.09 | 3.05 |

TABLE 9

|  |  | L0, L3 | | |
| --- | --- | --- | --- | --- |
|  |  | −0.067 mm | ±0 mm | +0.067 mm |
| L1, L2 | −0.15 mm | 3.93 | 2.60 | 1.24 |
|  | ±0 mm | 2.97 | 3.64 | 2.35 |
|  | +0.15 mm | 2.16 | 3.47 | 3.30 |

Table 8 indicates a value of the ratio D/P of the distance D between the centers of the adjacent light receiving elements to the pitch P of the shadow of the index grating pattern 15 formed on the light receiving element array 12 within the range of the manufacturing error described above. The ratio is within a range of 2.98 to 3.14, which satisfies the condition that the ratio is within the range of n−¼ to n+¼ inclusive (n is a natural number). This decreases the distortion of the Lissajous figure caused by the shadow of the index grating pattern 15.

Table 9 indicates a value of the index I regarding the shadow of the light source grating pattern 14 formed on the light receiving element array 12 within the range of the manufacturing error described above. The value of the index I is within a range of 1.24 to 3.93, which satisfies the condition of I≥¾. In this manner, the light source grating pattern 14 satisfies the condition I≥¾, so that the phases of the shadow of the grating pattern between the different light receiving element groups are shifted. Thus, the distortion of the Lissajous figure is decreased even if a manufacturing error occurs.

Consequently, with the optical encoder to which the present example is applied, the compact optical encoder using the moire detection method that decreases the distortion or the individual difference of the incremental signal can be provided.

The description has been given of the rotary encoder in the exemplary embodiments described above, but the exemplary embodiments can be applied to a linear encoder. The encoder can be used to detect a rotation angle and a position of an object. The position and the angle (displacement) as detection results detected by the encoder are used by a controller (control unit) that controls an actuator (driving unit), such as a motor, to control the displacement of the actuator. As a control apparatus to which the encoder according to the present exemplary embodiment is applied, there is a robot that includes an actuator that drives joints of the robot and an encoder that measures a rotation angle of the actuator. Furthermore, there is a galvano scanner that includes a motor and an encoder that measures a rotation angle of a rotation axis of the motor. Moreover, there is a stage apparatus that includes a linear motor that drives a stage and an encoder that measures the position of the stage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-082633, filed May 8, 2020, and No. 2020-164698, filed Sep. 30, 2020, which are hereby incorporated by reference herein in their entirety.

What is claimed is:

1. An optical encoder comprising:
   a light source;
   a first grating pattern having a first pitch, light from the light source being incident on the first grating pattern;
   a second grating pattern having a second pitch, light from the first grating pattern being incident on the second grating pattern;
   a third grating pattern having a third pitch different from the second pitch, light from the second grating pattern being incident on the third grating pattern; and
   a light receiving element array configured to receive light from the third grating pattern,
   wherein the light receiving element array includes a plurality of light receiving elements configured to output signals in mutually different phases, the plurality of light receiving elements being periodically arrayed as one group,
   wherein the light receiving element array is configured to receive light that forms moire fringes from the third grating pattern in a state in which a pitch of light intensity distribution of a shadow of the first grating pattern on a light receiving surface of the light receiving element array is away from a half pitch or pitch of the one group of the light receiving elements,
   wherein a ratio of a luminous flux divergence caused by first order diffracted light from the third grating pattern propagating through a space from the third grating pattern to the light receiving element to a pitch of the shadow of the third grating pattern projected on the light receiving element is higher than or equal to 0.97 and lower than or equal to 1.85.

2. A control apparatus comprising:
   the optical encoder according to claim 1; and
   a control unit configured to control displacement of an object based on a result of detection by the optical encoder.

3. The optical encoder according to claim 1, wherein the second grating pattern is movable relative to the first grating pattern and the third grating pattern.

4. The control apparatus according to claim 2, wherein, in the optical encoder, the second grating pattern is movable relative to the first grating pattern and the third grating pattern.

5. The optical encoder according to claim 1, wherein a ratio of the pitch of the light intensity distribution of the shadow of the first grating pattern on the light receiving surface of the light receiving element array to a pitch of the one group of the light receiving elements is lower than or equal to 0.475.

\* \* \* \* \*